United States Patent
Kimura et al.

[11] 3,765,741
[45] Oct. 16, 1973

[54] METHOD OF FORMING THREE-DIMENSIONAL IMAGES USING MULTI-IMAGE HOLOGRAM

[75] Inventors: Yoshiaki Kimura; Masanori Kawai, both of Hachiohji-shi, Tokyo; Tadashi Kasahara, Nakano-ku, Tokyo, all of Japan

[73] Assignee: Konishiroku Photo Industry Co., Ltd., Tokyo, Japan

[22] Filed: Dec. 27, 1971

[21] Appl. No.: 212,535

[30] Foreign Application Priority Data
Dec. 26, 1970 Japan.............................. 45/118907

[52] U.S. Cl.................................. 350/3.5, 350/130
[51] Int. Cl. ........................................ G02b 27/00
[58] Field of Search.................... 350/3.5, 167, 130; 355/2

[56] References Cited
UNITED STATES PATENTS
3,515,452   6/1970   Pole...................... 350/3.5
3,608,993   9/1971   DeBitetto.............................. 350/3.5

OTHER PUBLICATIONS

DeBitetto, Applied Optics, Vol. 8, No. 8, Aug. 1969, pp. 1740–1741.

Lohmann, IBM Technical Disclosure Bulletin, Vol. 10, No. 10, March 1968, pp. 1452–1454.

Primary Examiner—David Schonberg
Assistant Examiner—Ronald J. Stern
Attorney—Richard C. Sughrue et al.

[57] ABSTRACT

A method of forming a three-dimensional image, comprising the general steps of taking a picture of an object illuminated by incoherent light through a lens array comprising a small number of lenses, projecting the image onto a diffusion screen through a lens array having the same performance as that of the lens array used for producing the image, and recording the projected image through the second lens array.

14 Claims, 24 Drawing Figures

Patented Oct. 16, 1973

3,765,741

METHOD OF FORMING THREE-DIMENSIONAL IMAGES USING MULTI-IMAGE HOLOGRAM

BACKGROUND OF THE INVENTION

This invention relates to a method of forming a three-dimensional image by the use of a multi-image hologram, and more particularly to a method of recording and reproducing a three-dimensional image of an object illuminated by incoherent light utilizing the art of holography employing a plurality of lenses.

It has been suggested that an image of an object illuminated by incoherent light should be reproduced in a three-dimensional way in copending Japanese Patent Applications Nos. 58954/70 and 80510/70 filed by an applicant equivalent to the assignee of this application. In the method suggested therein, a plurality of lenses having a high performance as that of the photographic lens are arranged in a matrix pattern to form a lens array and a plurality of images of the object illuminated with incoherent light viewed from a plurality of viewpoints corresponding to the respective apertures of the lenses are recorded on a photosensitive material in the first step thereof. In the second step, the photosensitive material is photographically processed into a positive through a reversal process and arranged at a position having the same relation with the lens array as is had at the time of recording, and the photosensitive material bearing the positive image is illuminated by coherent light to project the images onto the focal plane beyond the lens array where a photosensitive material for holography is located so that the images may be recorded on the photosensitive material for holography as an image hologram in cooperation with coherent reference light in incident to the photosensitive material. In the third step, the hologram is illustrated by an incoherent light source having the expansion, i.e., the shape or the intensity distribution determined by the arrangement of a lens array, and the images viewed from the respective viewpoints are reconstructed without a dead space between the apertures in a space corresponding to the space occupied by the lens array in the recording.

As another method of eliminating the dead space, a method has been suggested in the foregoing Japanese Patent Application No. 80510/70 in which coherent and expanded light rays are used for the reference light in the second step and a point source or a source emitting somewhat expanded light rays is used for the reconstruction of the image in the third step. By the use of these methods, it is possible to reconstruct a three-dimensional image of high sharpness presenting a right parallax variation accompanying the movement of the viewpoint.

In the foregoing two copending Japanese Patent Applications, a method is disclosed in which the range of vision within which the observer can see the three-dimensional image is determined by the size of the lens array used in the first step. Accordingly, it is necessary to enlarge the lens array in the device used in the first step in order to obtain a range of vision of sufficiently large size. Two problems occur here in order to enlarge the device. One of the problems is the difficulty in designing and making the large size of multi-lens type camera in the sense of mechanical and optical engineering, and the other of the problems is the limit for the environment in which the large size of device can be handled and used. The former problem includes, for example, the difficulty in providing a shutter mechanism which is operated for all the lenses constituting the lens array at the same time. This problem of the shutter is in fact very difficult and troublesome in a technical sense. The latter problem includes, for example, the difficulty in carrying the large device and in handling and using the device in the open air.

Another disadvantage inherent in the method disclosed in the foregoing copending applications is that the image obtained through the first step should be converted into a positive image in order that the image may be used in the second step. The photosensitive material used in the first step is required to be of large size and have comparatively high resolution. Such a positive photosensitive material, however, is difficult to obtain, since most of the commercially available types of the positive photosensitive material are of small size. Accordingly, on most occasions, negative type photosensitive material is used for recording the image in the first step. In the case where a negative photosensitive material is used in the first step, it is necessary to make a positive image by contact printing on another negative photosensitive material by the use of the negative image. Through this contact printing process, the resolution is reduced and further another problem occurs that the positioning of the positive image made by the contact printing relative to the lens array becomes difficult.

In the foregoing two copending applications, Japanese Patent Applications Nos. 58954/70 and 80510/70, the space in which the image is reconstructed substantially corresponds to the original space where the object existed. This is a disadvantage as well as an advantage. In other words, it is sometimes preferred to make the reconstructed image distorted to some extent intentionally to emphasize or reduce the three-dimensional effect. In the method disclosed in the foregoing patent applications, however, it is impossible to effect such an international operation to distort the image.

SUMMARY OF THE INVENTION

The primary object of the present invention is to provide a method of forming a three-dimensional image using a hologram in which a sharp and reliable three-dimensional image is formed.

Another object of the present invention is to provide a method of forming a three-dimensional image in which the abovementioned disadvantages are eliminated.

Other objects will be made explicit in the detailed description of the present invention hereinbelow described.

In order to accomplish the above described objects of the present invention, the method of forming a three-dimensional image in accordance with the invention comprises taking a picture of an object illuminated by incoherent light through a lens array consisting of a comparatively small number of lenses, projecting the image onto a diffusion screen through a lens array having the same performance as that of the lens array used for taking the image, and recording the projected image through a second lens array.

The present invention provides a method of forming a three-dimensional image basically composed of the following four steps:

First Step

A plurality of lenses having as high performance as that of the photographic lens are arranged in one direction with equal intervals to form a lens array (first lens array) and a series of images (first image matrix) of different viewpoints of an object illuminated by incoherent light are obtained through said lens array.

Second Step

The respective images of the first image matrix obtained in the first step are projected in turn onto a diffused screen through a lens array having the same performance as that of the lens array used in the first step. At the same time, the image projected on the diffused screen is recorded on a second photosensitive material through a second lens array consisting of a plurality of lenses having as high performance as that of the photographic lens arranged in the matrix patterns. In this recording step, a group of lenses in the second lens array extending in a direction perpendicular to the direction in which the first lens array extends correspond to one lens in the first lens array. Then, through a photographic process of the second photosensitive material exposed, the second image matrix is obtained.

Third Step

The second image matrix obtained through the second step is illuminated by laser light from the back side and the images thereon are projected on a photosensitive material for holography through a lens array arranged in a matrix pattern having the same performance as that of the lens array (second lens array) used in the second step. The photosensitive material for holography is located at the position in the vicinity of the real image of the second image matrix, and the images projected thereon are recorded as an image hologram by means of the reference light which is coherent with the illumination light.

Fourth Step

The image hologram obtained through the third step is illuminated by incoherent light source for reconstruction from the direction substantially opposite to the direction in which the reference light was produced in the third step. Thus, the real image of the lens array is reconstructed and the image of the object is observed from the position of the real image.

The dead space between the apertures can be eliminated by using a light source having expansion light for either the reference light in the third step or the illuminating light in the fourth step.

The advantages of the present invention are:

1. Being able to provide a method of forming a three-dimensional image which can be made by the use of a black and white photosensitive material.
2. Being able to provide a method of forming a three-dimensional image in which the duplication of the image can be carried out easily.
3. Being able to provide a method of forming a three-dimensional image in which a three-dimensional image can be reproduced using a simple light source such as an ordinary incandescent lamp.
4. Being able to provide a method of forming a three-dimensional image in which a three-dimensional image of a moving object can be formed.
5. Being able to provide a method of forming a three-dimensional image in which the reconstructed image space can be optionally distorted.
6. And being able to provide a method of forming a three-dimensional image in which the magnification of the reproduction space can be optionally varied.

BRIEF DESCRIPTION OF THE DRAWINGS

Other features, objects and advantages of the present invention will be made apparent from the following detailed description of the preferred embodiments thereof taken in conjunction with the accompanying drawings in which.

DESCRIPTION OF THE PREFERRED EMBODIMENTS

Figure 1:
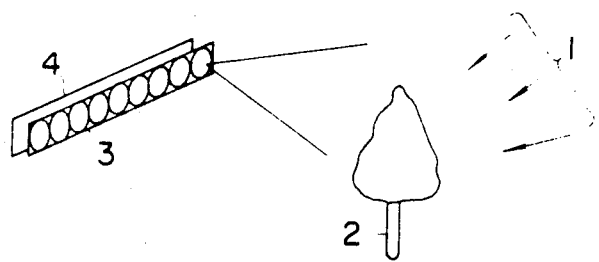
FIG. 1 is a perspective view showing the first step of the method in accordance with the first embodiment of the present invention.

Now the present invention will be described in detail with reference to several particular embodiments thereof.

FIRST EMBODIMENT

The first embodiment of the method in accordance with the present invention relates to a general method of forming a three-dimensional image and comprises the following four steps:

First Step

A plurality of lenses having as high performance as that of the photographic lens are arranged laterally in a line at equal intervals to form a lens array (first lens array) and a series of images of different viewpoints of an object illuminated by incoherent light are recorded on a black and white photosensitive material by the use of the lens array. Through a phtotographic process of the photosensitive material bearing a latent image, a first image matrix is obtained.

Second Step

The respective images of the first image matrix obtained in the first step are projected in turn onto a diffused screen through a lens array having the same performance as that of the lens array used in the first step. At the same time, the image projected on the diffused screen is recorded on a second black and white photosensitive material through a lens array (second lens array) consisting of a plurality of lenses having as high performance as that of the photographic lens arranged in a matrix pattern at equal intervals. In this recording step, a group of lenses in the second lens array arranged in a direction perpendicular to the direction in which the lenses in the first lens array are arranged correspond to one lens in the first lens array. Thus, a large number of identical images are arranged in one direction on the second photosensitive material. By a photographic process of the second photosensitive material having a latent image, a second image matrix is obtained.

Third Step

The second image matric obtained through the second step is illuminated by laser light from the back side and the images thereon are projected on a photosensitive material for holography through a lens array arranged in matrix pattern having the same performance as that of the lens array (second lens array) used in the second step, the photosensitive material for holography is located at the position in the vicinity of the real image of the second image matrix, and the images projected thereon are recorded as an image hologram by means of the reference light which is coherent with the illumination light.

Fourth Step

The image hologram obtained through the third step is illuminated by incoherent light for reconstruction having expanded distribution from the direction substantially opposite to the direction in which the reference light was produced in the third step to reconstruct a real image of the lens array. Then, the image of the object is observed from the position where the real image is focused.

Now referring specifically to the drawing, each of the steps of the method in accordance with preferred embodiments of the present invention will be described in detail.

FIG. 1 shows the arrangement of the image forming system for the first step of the method of the present invention in accordance with the first embodiment thereof. The reference numeral 1 shows incoherent light illuminating an object 2 which is to be recorded and reproduced through the image forming method of the present invention. The reference numeral 3 shows a lens array consisting of a plurality of lenses having as high performance as that of the photographic lens arranged laterally in one direction (in the horizontal direction in the drawing) at equal intervals, which is referred to as a "first lens array". The reference numeral 4 shows a black and white photosensitive material located at the position where the image of the object is focused on the back side of the lens array. This material is referred to as a "first photosensitive material."

In the first step, a series of images of the object of different viewpoints are taken by the use of the arrangement. Although a shutter for controlling the exposure of the image recording is omitted in FIG. 1, it will be understood that a shutter mechanism may be provided which effects all the lenses in the array at a time or which effects the respective lenses one-by-one in turn in the case where a still object is taken. By a photographic process of the photosensitive material exposed to the light image, a series of images of different viewpoints, namely, a first image matrix, is obtained.

Figure 2:
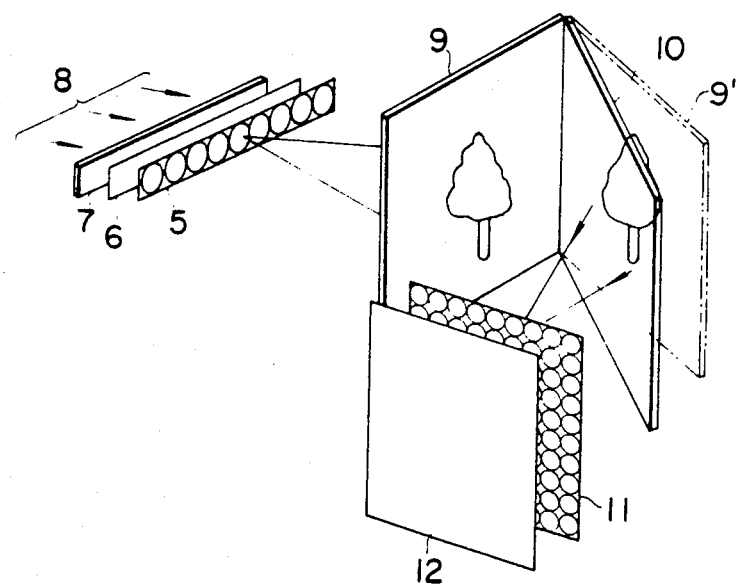
FIG. 2 is a perspective view showing the second step of the method in accordance with the first embodiment. thereof.

FIG. 2 shows an arrangement of the image forming system used for carrying out the second step of the method of the present invention in accordance with the first embodiment thereof. In FIG. 2 the reference numeral 5 shows a lens array having the same performance as that used in the first step, 6 shows the first image matrix obtained in the first step, 7 shows a diffused plate for making a diffused illumination, 8 shows incoherent light for illuminating the first image matrix 6, 9 shows a diffused screen, 10 shows a plane mirror, 9' shows a virtual image of the diffused screen 9 made by the plane mirror 10, 11 shows a lens array (second lens array) consisting of a plurality of lenses having as high performance as that of the photographic lens arranged in a matrix pattern at equal intervals, and 12 shows a second photosensitive material located behind the second lens array 11 at the focusing position of the diffused screen image. In the second step, the first image matrix 6 is located at a position behind the lens array 5 in the same relation to the lens array 5 as that made in the case of recording in the first step. The first image matrix 6 is illuminated by diffused incoherent light 8 through the diffused plate 7, and only one image in the first image matrix 6 is projected onto the diffused screen 9 through only one lens in the lens array 5 by opening only one shutter in front of the lens. Behind the diffused screen 9 is located a plane mirror 10 to form a virtual image 9' of the diffused screen 9, and the second lens array 11 and the second photosensitive material 12 are located facing the virtual image 9' of the diffused screen. the second photosensitive material 12 is located at a position where the virtual image 9' is focused through the lens array 11 and a real image on the diffused screen is formed. The image projected and focused on the diffused screen 9 is recorded on the second photosensitive material 12 through the plane mirror 10 and the second lens array 11. In this recording step, an image of the first image matrix is recorded on the second photosensitive material 12 through only one group of lenses arranged vertically among the lens array 11 corresponding to the image projected (i.e., corresponding to the lens in the lens array 5 which projects the image). Consequently, the second pohtosensitive material 12 is provided with a plurality of identical images arranged vertically in a line.

Thereafter, another shutter belonging to another lens among the lens array 5 is opened to project a different image from the image matrix 6 onto the diffused screen 9. At the same time, the image projected onto the diffused screen 9 is recorded on the second photosensitive material 12 through another group of lenses arranged vertically among the second lens array 11. Such an operation is conducted for all the lenses in the first lens array 5 and all the images in the first image matrix 6. After all the images in the first image matrix 6 are recorded on the second photosensitive material 12 through the second lens array 11, the second photosensitive material 12 is photographically processed to obtain a second image matrix.

Figure 3:
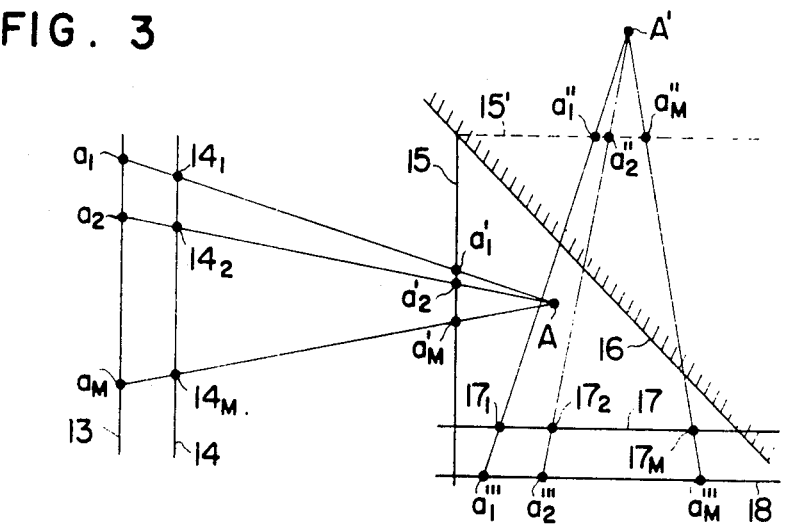
FIG. 3 is a plan view showing a geometric explanation of the correspondence between the respective lens constituting the lens array having the same performance as that of the first lens array and the respective group of the lenses extending in a direction in the second lens array of the matrix pattern.

Now, the manner of making the correspondence between the respective lenses constituting the lens array 5 and the respective groups of vertically arranged lenses constituting the second lens array 11 of matrix pattern will be explained referring to FIG. 3. FIG. 3 is a plan view of the arrangement of the image forming system shown in FIG. 2, wherein the reference numeral 13 shows a first pohtosensitive material (first image matrix), 14 shows a first lens array (lens array having the same performance as that of the first lens array), 15 shows a diffused screen, 16 shows a plane mirror, 15' shows a virtual image of the diffused screen 15 made by the plane mirror 16, 17 shows a second lens array of matrix pattern, and the reference numeral 18 indicates a second photosensitive material. The first lens array 14 is assumed here to be a plurality of lenses arranged horizontally at equal intervals, where the number of the lenses is M and respective lenses are denoted as $14_1$, $14_2$, $- 14_M$. Similarly, the second lens array 17 is assumed here to be a number of lenses arranged in a matrix pattern at equal intervals, where the number of lenses arranged horizontally is M and the number arranged vertically is N and the respective lenses of each horizontal group of lenses (consisting of N pieces of lenses) are denoted as $17_1$, $17_2$, $- 17_M$.

Assuming now an object point is denoted by A, the image of the object point A is recorded on the first photosensitive material 13 as a point $a_1$ through a lens $14_1$ forming a part of the first lens array 14. Similarly, the point is recorded as a point $a_2$ through the lens $14_2$ and as a point $a_M$ through the lens $14_M$. After the photographic process, the first photosensitive material 13 is located at the same position relative to the lens array having the same performance as that of the first lens array 14 as the position thereof relative to the first lens array 14 when the image was recorded thereon. First, the point image $a_1$ is projected onto the diffused screen 15 by use of the lens $14_1$. The point $a_1$ is projected onto the diffused screen 15 as a point $a_1'$ and a virtual image of the point $a_1'$ by the plane mirror 16 is formed at the position of $a_1''$. Then, the point $a_1''$ is recorded on the second photosensitive material 18 by use of a single one group of lenses $17_1$ forming a part of the lens matrix of the second lens array 17. Then, the point $a_2$ is projected onto the diffused screen 15 through the lens $14_2$ and the projected point $a_2'$ is recorded on the second photosensitive material 18 by use of another group of the lenses $17_2$.

By repeating such operations for M times, all the images on the first photosensitive material 13 are transferred to the second photosensitive material 18. The images of the points $a_1''$, $a_2''$, $- a_M''$ formed through the lens groups $17_1$, $17_2$, $- 17_M$ are recorded on the second photosensitive material 18 as $a_1'''$, $a_2'''$, $- a_M'''$.

As will be understood, in general, the correspondence between the lenses in the first lens array 14 and the lenses in the second lens array 17 is made so that the lens $14_j$ corresponds to the lens $17_j$, wherein the suffix j indicates the position of the lens numbered from the left when viewed from the back side of the lens array.

The third step of the first embodiment of the present invention is the step where one sheet of the image hologram is produced from the image matrix obtained through the second step by use of a coherent multi-recording.

Figure 4:
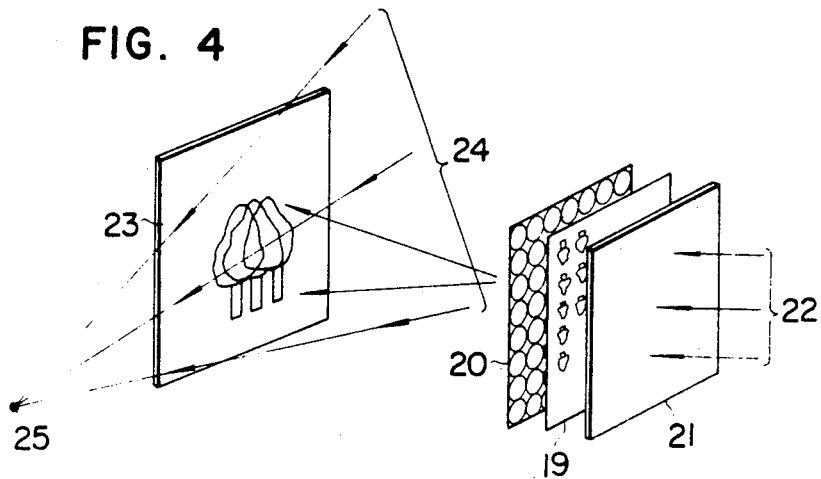
FIG. 4 is a perspective view showing the third step of the method in accordance with the first embodiment of the present invention.

In FIG. 4, the arrangement of the image forming system used in the third step of the first embodiment of the present invention is shown. In FIG. 4, the reference numeral 19 indicates a second image matrix obtained through the photographic process of the second photosensitive material exposed in the second step, 20 shows a lens array of matrix pattern having the same performance as that of the second lens array used in the second step, 21 shows a diffused plate for giving a diffused illumination to the second image matrix 19, 22 shows laser light for illumination, 23 shows a photosensitive material for holography, and 24 shows laser light for reference light which is in coherent relationship with the laser light 22 for illumination. The reference numeral 25 indicates a point into which the laser light for reference light concentrates. As shown in FIG. 4, the second image matrix 19 is located behind the lens array 20 of matrix pattern in the same relation therewith as the relation made in the second step when the image was recorded thereon. Further behind the second image matrix 19, a diffused plate 21 is located and illuminated by laser light 22 as shown in FIG. 4. The second image matrix 19 illuminated by laser light 22 is projected forward through the lens array 20. (Of course, although in projection, one lens in the lens array 20 corresponds to one image in the image matrix 19, if the screen is placed at the focusing position, different images of different viewpoints would be all superposed on the screen since all the images are projected at one time.) In the vicinity of the focusing position of the second image matrix projected through the lens array 20, a photosensitive material 23 for holography is placed. As laser light 24 concentrating into a point 25 is combined with the laser light projected from the lens array as a reference light, so that the images of the second image matrix 19 are holographically recorded on the photosensitive material 23 as an image hologram. Thus, obtained is an image hologram, after the photographic process of the photosensitive material, in which various images of different viewpoints are superposed in a coherent way.

Figure 5:
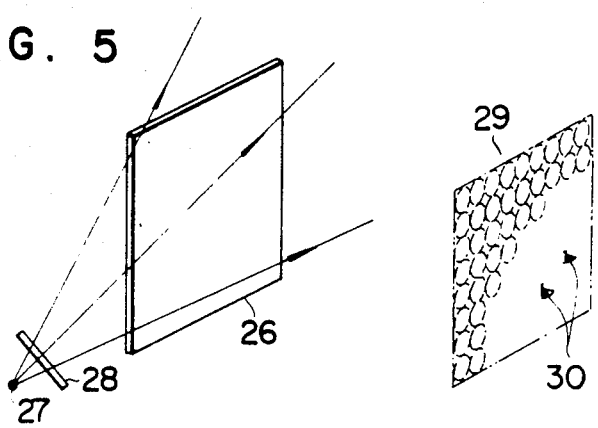
FIG. 5 is a perspective view showing the fourth step of the method in accordance with the first embodiment thereof.

The fourth step of the method in accordance with the first embodiment of the present invention is the step in which the reconstruction of the three-dimensional image is carried out by use of the image hologram obtained through the third step. FIG. 5 shows the arrangement of the image reconstructing system for carrying out the fourth step of the method of the present invention, wherein the reference numeral 26 shows the image hologram obtained through the third step, 27 shows an incoherent light source for reconstruction, 28 shows a color filter, 29 shows the real image of the lens array of matrix pattern used in the third step reconstructed from the image hologram 26, and 30 shows the positions of viewpoints. In this arrangement, by illuminating the image hologram 26 with expanded incoherent light source 27 having the diverging point at the position corresponding to the concentrating point (the numeral 25 in FIG. 4) of the reference light used at the time of recording the hologram, a real image of the lens array is reconstructed at a position corresponding to the position where the lens array was located in the third step. By locating eyes in the vicinity of the real image of the lens array 29, the images of the object viewed from the viewpoints corresponding to the position where the eyes are located can be seen. Accordingly, when viewed with both eyes, a three-dimensional image can be seen. Further, if the eyes are moved left and right, the image can be seen changing as the eyes move. In other words, by the present invention, one can see a three-dimensional image presenting parallax variation. The reference numeral 28 in FIG. 5 indicates a filter for selecting light of proper wavelength in order to reduce the color aberration in the real image of the lens array of matrix pattern.

Although an expanded light source is used in the fourth step as the illuminating light, namely, not a point source, a point source may be employed here if the reference light used in the third step should be an expanded light. The reason for employing the expanded light source is disclosed in the above-mentioned copending applications, Japanese Patent Applications Nos. 58954/70 and 80510/70.

In essence, by employing an expanded light source for either the reference light in the third step or the illuminating light in the fourth step, a dead space can be eliminated. Of course, the expanded light source may be employed for both the light sources. Although either alternative can be adapted to the present invention for the sake of simplification the following embodiments will be described with the expanded light only employed as the illuminating light for eliminating the dead space.

In the second step of the first embodiment of the present invention, a plane mirror 10 is employed between the transparent type diffused screen 9 and the lens array 11 of matrix pattern as shown in FIG. 2. This is because the reconstructed image would be inverted when the first image matrix photographed in the first step of the first embodiment by using the first lens array is located at a position behind a lens array having the same properties as the first lens array in the same relation to the lens array as that made in the case of recording in the first step, and a transparent type diffused screen is employed into the system in the second step. However, it will be readily understood that the method of making finally a right image reconstructed is not limited to the employment of the plane mirror disposed between the transparent type diffusion screen and the lens array. Generally, it is only required to provide a single reflecting surface somewhere in some step of the method of the invention in order that the right image may be finally observed without inversion. Concretely, for example, there are the folloiwng five ways to prevent the inversion of the image in the present invention:

I. A plane reflecting surface is provided between the object and the first lens array in the first step so that the object may be recorded by way of the plane reflecting surface;

II. A plane reflecting surface is provided in the second step of the invention between the lens array having the same performance as that of the first lens array and the transparent type diffused screen so that the first image matrix may be projected onto the diffused screen by way of the plane reflecting surface;

III. A plane reflecting surface is provided in the second step of the present invention between the transparent type diffused screen and the second lens array so that the image on the diffused screen may be recorded on the second photosensitive material by way of the plane reflecting surface;

IV. A plane reflecting surface is provided in the third step of the present invention between the second lens array and the photosensitive material for holography so that the second image matrix may be projected onto the photosensitive material for holography by way of the plane reflecting surface; and V. A plane reflecting surface is provided in the fourth step of the method of the present invention between the image hologram and the viewpoint so that the reproduced image may be observed by way of the plane reflecting surface.

Figure 6:
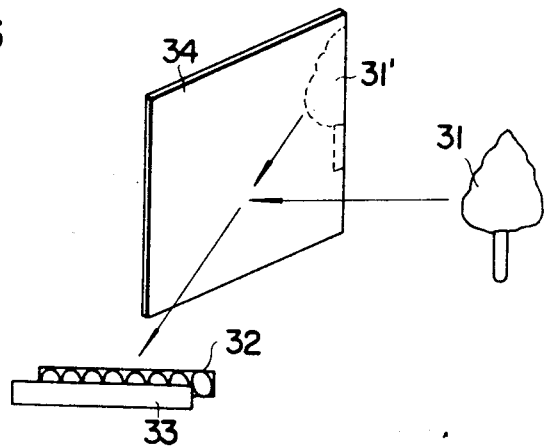
FIG. 6 is a perspective view showing an arrangement of the optical elements for carrying out a method I to properly orient the reconstructed image space in the first embodiment of the present invention.

FIG. 6 shows the arrangement for carrying out the above method I, wherein the reference numeral 31 shows an object to be recorded and reconstructed, 32 shows a first lens array, 33 shows a first photosensitive material, 34 shows a plane mirror, and 31' shows a virtual image of the object 31 formed by means of the plane mirror 34. In the method I, the image of the object of different viewpoints is recorded on the first photosensitive material 33 by way of the plane reflecting surface.

Figure 7:
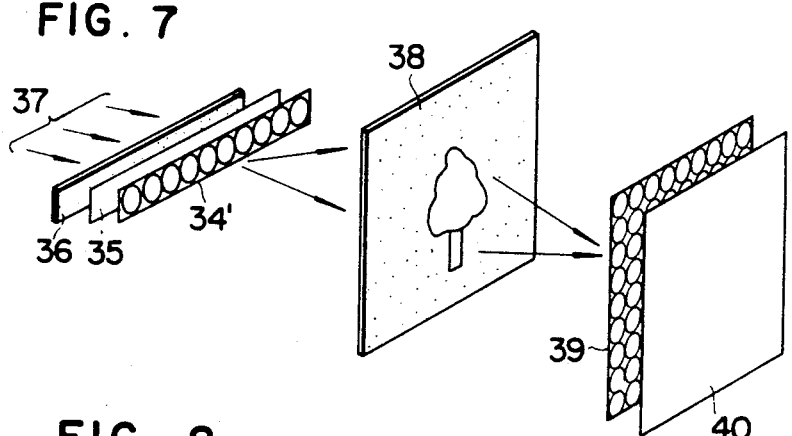
FIG. 7 is a perspective view showing an arrangement of the optical elements in which the second step of the method in accordance with the first embodiment of the present invention is carried out without using a reflecting plane by utilizing the method I shown in FIG. 6.

In accordance with the method I, no reflecting surface is required in the subsequent steps and, accordingly, the plane mirror 10 in the second step of the first embodiment of the method of the present invention as shown in FIG. 2 can be eliminated. The arrangement in which the second step of the first embodiment of the present invention is carried out without using the reflecting surface is shown in FIG. 7. In the drawing, the reference numeral 34' shows a lens array having the same performance as that of the lens array used in the first step, 35 shows the first image matrix obtained through the first step, 36 shows a diffused plate, 37 shows incoherent light for illuminating the first image matrix 35, 38 shows a diffused screen, 39 shows the second lens array and 40 shows the second photosensitive material. The correspondence between the lenses constituting the first lens array and the lens groups constituting the second lens array in the arrangement as shown in FIG. 7 should be so made that the $j$-th lens from the left of the first lens array when viewed from the back side corresponds to the $j$-th lens group from the right of the second lens array when viewed from the back side.

Figure 8:
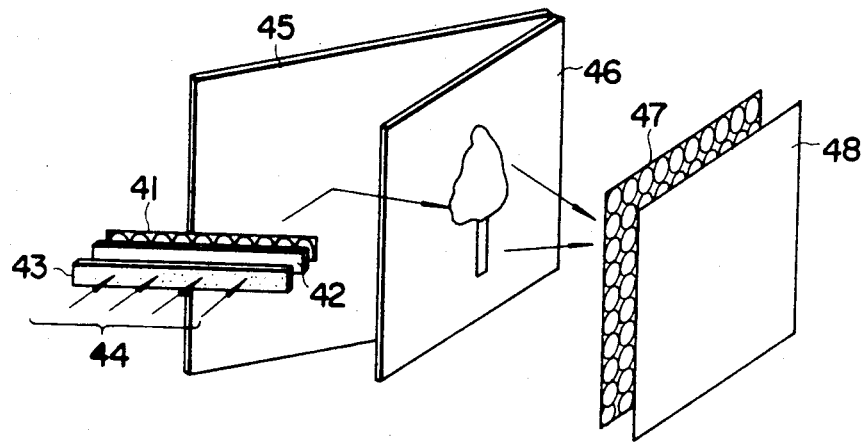
FIG. 8 is a perspective view showing an arrangement of the optical elements for carrying out a method II to properly orient the reconstructed image space in the first embodiment of the present invention.

FIG. 8 shows the arrangement of the image forming system for carrying out the above method II. In the drawing, the reference numeral 41 shows a lens array having the same performance as that of the first lens array, 42 shows the first image matrix, 43 shows a diffused plate, 44 shows incoherent light for illuminating the first image matrix 42, 45 shows a plane mirror, 46 shows the diffused screen, 47 shows a second lens array, and 48 shows the second photosensitive material. The correspondence between the lenses constituting the first lens array and the lens groups constituting the second lens array in the arrangement as shown in FIG. 8 should be made in such a way that the $j$-th lens from the left of the first lens array when viewed from the back side corresponds to the $j$-th lens group from the left of the second array when viewed from the back side. The image on the first photosensitive material is recorded on the second photosensitive material according to the correspondence as described above.

The arrangement of the image forming system for carrying out the method III is shown in FIG. 2 as described hereinbefore.

Figure 9:
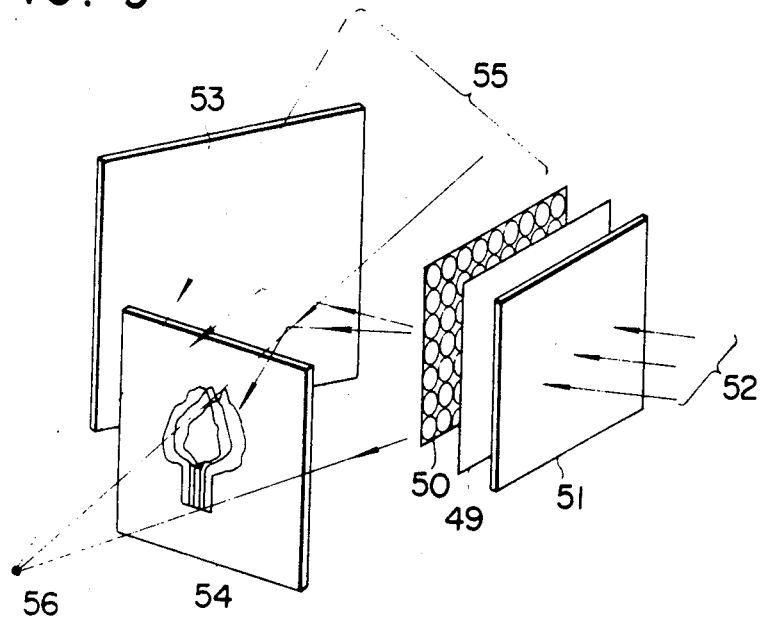
FIG. 9 is a perspective view showing an arrangement of the optical elements for carrying out a method IV to properly orient the reconstructed image space in the first embodiment of the present invention.

FIG. 9 shows the arrangement of the image forming system for carrying out the above method IV, wherein the reference numeral 49 shows a second image matrix, 50 shows a lens array having the same performance as that of the second lens array, 51 shows a diffused plate, 52 shows laser light for illumination, 53 shows a plane mirror, 54 shows a photosensitive material for holography, 55 shows laser light for reference light and 56 shows the point of concentration of the laser light for reference light. In the case that such an arrangement is employed in the third step of the first embodiment of the present invention, a reflecting surface is not required in the other steps of the invention. Accordingly, in this case, the arrangement for the second step may be that shown in FIG. 7.

Figure 10:
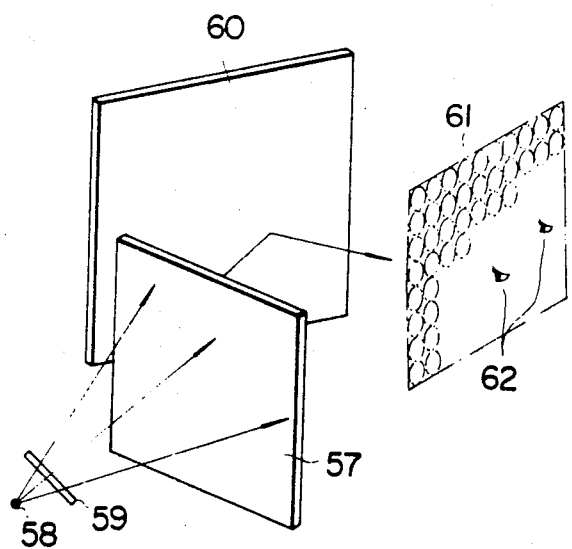
FIG. 10 is a perspective view showing an arrangement of the optical elements for carrying out a method V to properly orient the reconstructed image space in the first embodiment of the present invention.

FIG. 10 shows an arrangement of the image reconstructing system for carrying out the above method V, wherein the reference numeral 57 shows an image hologram, 58 shows an incoherent light source for reconstruction, 59 shows a color filter, 60 shows a plane mirror, 61 shows a real image of the second lens array reconstructed from the image hologram 57 and 62 shows the positions of the viewpoints for viewing the three-dimensional image reconstructed.

So long as such an arrangement is employed in the fourth step for observation of the reconstructed image, no reflecting surface is required to be provided in any other ste antecedent thereto.

The five methods described above have been concerned with a method of obtaining the right orientation of the reconstructed image space or of obtaining the image space reconstructed without inversion under such a circumstance that the first image matrix is located relative to the lens array in the same relation therewith as that at the time of recording and further the image matrix is projected onto a transparent type diffused screen. (It should be understood that the "right orientation" referred to here should be considered to include such a state as that where the image that is not inversed is reconstructed with emphasized stereoscopic effect or with distortion. The problem of the distortion of space will be described in detail hereinbelow.) If considering only one condition among the above two conditions where the transparent type diffused screen is used, it is possible to obtain the right orientation of the reconstructed image space without using a reflecting surface. This can be done by projecting the first image matrix obtained through the first step in the second step with the image inverted and arranged upside down.

The diffused screen used in the second step of the present invention for projecting the first image matrix thereon has been described to be of transparent type screen. This screen used on the second step of the present invention, however, may be a reflection type screen so long as it is of the diffused type. In the case where a reflection type diffused screen is used, the arrangement of the image forming system for obtaining the second image matrix becomes slightly different from that shown in FIG. 2, FIG. 7 or FIG. 8, and is like that shown in FIGS. 11, 12 and 13.

Figure 11:
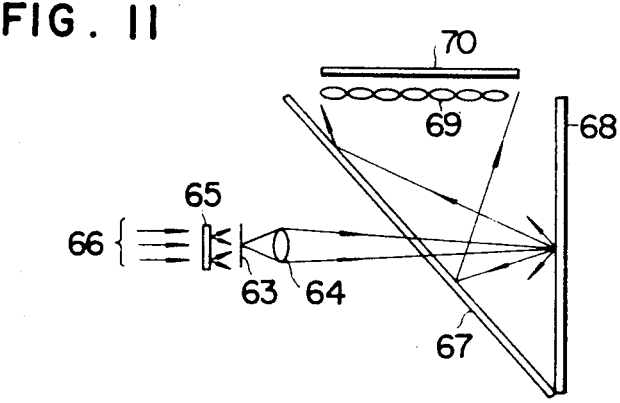
FIG. 11 is a plan view showing the arrangement of the optical elements in the case where a diffused screen of the reflection type is used as the diffused screen in the second step of the method in accordance with the first embodiment of the present invention.
Figure 12:
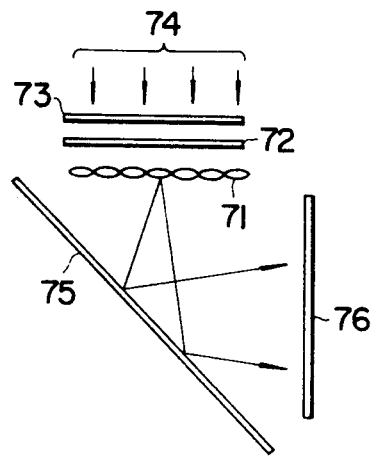
FIG. 12 is a plan view showing the arrangement of the optical elements for the third step of the method in accordance with the first embodiment of the present invention in the case where the arrangement shown in FIG. 11 is employed in the second step in the first embodiment of the invention.

FIG. 11 shows the arrangement of the image forming system used in the second step of the method of the present invention in which a reflection type diffused screen is used as the diffused screen. In FIG. 11 the reference numeral 63 shows the first image matrix obtained through the first step of the invention, and 64 shows a lens array having the same performance as that of the first lens array which consists of a plurality of lenses arranged in a direction perpendicular to the plane of the drawing sheet. The reference numeral 65 shows a diffused plate, 66 shows incoherent light for illuminating the first image matrix 63, 67 shows a half mirror, 68 shows a reflection type diffused screen, 69 shows a second lens array of matrix pattern, and 70 shows a second photosensitive material. In the drawing, the first image matrix 63 illuminated by diffused incoherent light 66 is projected on the reflection type diffused screen through the lens array 64 having the same performance as that of the first lens array. The image on the reflection type diffused screen 68 is recorded on the second photosensitive material 70 through the second lens array 69 by way of the half mirror 67. The correspondence between the lenses constituting the first lens array and the groups of the lenses constituting the second lens array is made in such a way that the $j$-th lens from the left of the first lens array when viewed from the back side corresponds to the $j$-th lens group from the left of the second lens array when viewed from the back side. If such an arrangement as described above is employed in the second step, it becomes necessary in the third step to project the second image matrix onto the photosensitive material for holography by way of a reflecting surface which is provided between the lens array having the same performance as that of the second lens array and the photosensitive material for holography as shown in FIG. 12. In the drawing, the reference numeral 71 shows a lens array having the same performance as that of the second lens array, 72 shows the second image matrix, 73 shows a diffused plate, 74 shows laser light for illumination, 75 shows a plane mirror, and 76 shows a photosensitive material for holography. (The reference light is omitted in the drawing.) It will be understood that if the reflecting surface is used in the third step, no reflecting surface is required in the subsequent fourth step.

Figure 13:
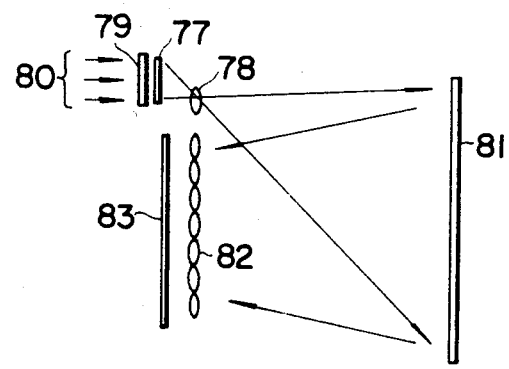
FIG. 13 is a plan view showing the arrangement in which a reflection type diffused screen is used in the second step of the method in accordance with the first embodiment of the present invention.

Generally speaking, if such an arrangement as shown in FIG. 11 is used in the second step, the right orientation of the reconstructed image space can be obtained by using a reflecting surface in one of the steps among the first, third and fourth steps. A more simple arrangement for the second step in which a reflection type diffused screen is used as shown in FIG. 13. In the drawing, the reference numeral 77 shows a first image matrix, 78 shows a lens array having the same performance as that of the first lens array consisting of a plurality of lenses arranged in the direction perpendicular to the sheet of the drawing, 79 shows a diffused plate, 80 shows incoherent light for illuminating the first image matrix 77, 81 shows a reflection type diffused screen, 82 shows a second lens array of matrix pattern, and 83 shows a second photosensitive material. In the drawing, the first image matrix 77 illuminated by diffused incoherent light 80 is projected onto a reflection type diffused screen through a lens array 78 having the same performance as that of the first lens array. The image on the diffused screen is recorded on the second photosensitive material 83 through the second lens array 82 disposed in front of the diffused screen. In this case also, the correspondence between the lenses constituting the first lens array and the groups of the lenses constituting the second lens array is made in such a way as that the $j$-th lens from the left of the first lens array when viewed from the back side corresponds to the $j$-th lens group from the left of the second lens array when viewed from the back side.

If such an arrangement as described above should be used on the second step, a reflecting surface is not required in any other steps of the method of the present invention.

As described hereinabove, different methods of effecting the right orientation of the reconstructed image space can be employed according to the various kinds of the diffused screen used in the second step and according to whether there is a reflecting surface or not. In any case, however, it is only required that the space which is finally obtained when the image is reconstructed is in the right orientation, which can be accomplished by any of the above five methods. The selection of the method should be conducted taking the situation of the whole system into consideration.

Any one of the above described methods can be applied to the other embodiments of the present invention as described hereinbelow. For the sake of simplification of explanation, however, the description will be limited in the following embodiments to the method in which a transparent type of diffused screen is used in the second step and a reflecting surface is disposed between the screen and the second lens array so that the image on the diffused screen is recorded on the second photosensitive material.

The space which is finally reconstructed has not been discussed so far. Now the influence on the reconstructed space finally obtained of the various parameters in the respective steps of the method of the present invention will be discussed hereinbelow.

The parameters which will influence the reconstruction image space, are as follows:

1. Focal length $f_1$ of the lenses constituting the first lens array in the first step.
2. Intervals $d_1$ between the lenses constituting the first lens array in the first step.
3. Distance $l_1$ between the center of the object and the first lens array in the first step.
4. Depth $a_1$ of the object (depth $a_1$ beyond the distance $l_1$).
5. Distance $l_2$ between the lens array having the same performance as that of the first lens array and the diffused screen in the second step.
6. Distance $l_3$ between the diffused screen (or the virtual image thereof) and the second lens array in the second step.
7. Intervals $d_2$ between the lens groups constituting the second lens array in the second step.
8. Focal length $f_2$ of the lenses constituting the second lens array in the second step.
9. Distance $l_4$ between the lens array having the same performance as that of the second lens array and the photosensitive material for holography in the third step.

Other than the parameters as described above, other factors such as the position of the reference light source in the third step or the position of the illuminating light source in the fourth step are considered to be the parameters influencing the reconstructed space. For the sake of simplification of explanation, however, the magnification of the holographic system in this case is assumed to be a unit.

Figure 14:
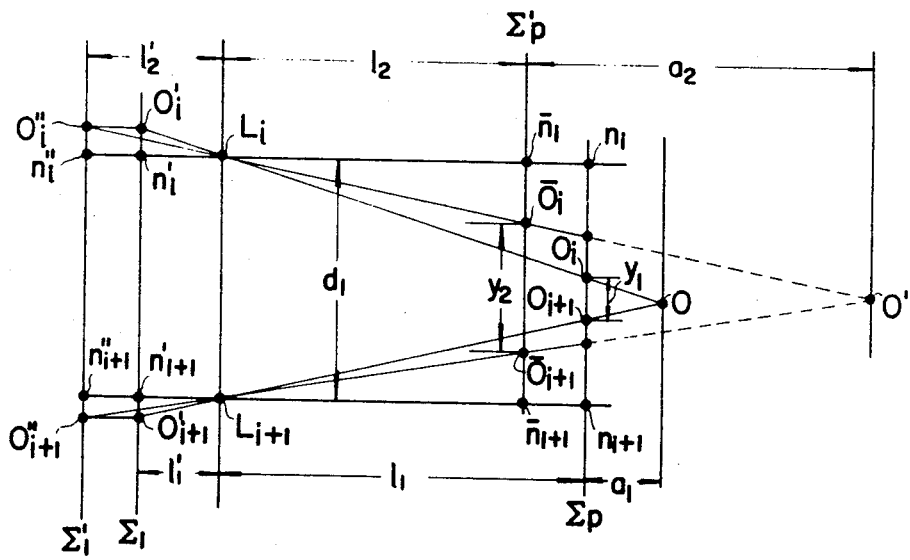
FIG. 14 is a geometric representation showing parameters having an influence on the reconstructed image space in the present invention and the construction of the reconstructed image space.

Now, as shown in FIG. 14, it is assumed that an object point 0 located at a distance $a_1$ from a focusing plane (denoted by $\Sigma_p$) of the lenses (focal length $f_1$, lens interval $d_1$) constituting the first lens array apart therefrom by the distance $l_1$ is taken by the use of the first lens array. When considering the $i$-th lens and $i+1$-th lens of the lens array, the point 0 is recorded on the first photosensitive surface $\Sigma_1$ (apart from the lens array by the distance of $l'_1$) as two points of $0'_i$ and $0'_{i+1}$. The photosensitive material on which the image of the point is recorded is processed photographically and placed at the same position as that at the time of recording, and the image thereon is projected forward through lenses $L_i$ and $L_{i+1}$ by the use of incoherent light.

If a diffused screen is at a position spaced apart from the lens array by the distance of $l_1$ in front thereof (in the case where a diffused screen is at the focusing position), the images of the points $0'_i$ and $0'_{i+1}$ are projected on the screen as the points $0_i$ and $0_{i+1}$, respectively. Then, it is assumed that a diffused screen is placed at a position spaced apart from the lens array in front thereof the distance of $l_2$. The plane on which the diffused screen is placed is referred to as plane $\Sigma'_p$. In order to project the image on the plane $\Sigma_1$ onto the plane $\Sigma'_p$, it is necessary to control the focusing position of the lens to be at the position spaced apart from the lens array by the distance of $l_2$. In the case that the focal length of the lens is fixed, it is necessary to move the photosensitive material (image, namely, the first image matrix) from the plane $\Sigma_1$ to the plane $\Sigma'_1$ in order to adjust the focusing position. If the image is moved to the position of the plane $\Sigma'_1$ and is illuminated from the back side, the points $0''_i$ and $0''_{i+1}$ (actually $0'_i$ and $0'_{i+1}$) are projected onto the diffused screen (on the plane $\Sigma'_p$) as two points $\overline{0}_i$ and $\overline{0}_{i+1}$. Now the intersections of the optical axis of the lenses $L_i$ and $L_{i+1}$ and the planes $\Sigma_p, \Sigma'_p, \Sigma_1, \Sigma'_1$ are denoted by $n_i$, $\overline{n}_i, n'_i, n''_i, n_{i+1}, \overline{n}_{i+1}, n'_{i+1}, n''_{i+1}$. In case where, as shown in FIG. 14, $\overline{0_i 0_{i+1}} = y_1$, $$y_1 = [a_1/(l_1 \pm a_1)] d_1 \tag{1}$$

(The minus sign represents the case where the object point is in front of the position of distance $l_1$ from the lens array by the distance of $a_1$.) and if, $$\overline{0_i 0_{i+1}} = y_2$$
$$y_2 = \pm d_1 \mp [(l_2 - f_1)/(l_1 - f_1)] (d_1 \mp y_1)$$
$$y_2 = \pm d_1 (1 - ](l_2 - f_1)/(l_1 - f_1)] \times [l_1)/(l_1 \pm a_1)] \tag{2}$$

Assuming that the position of the object point projected is spaced from the position of the distance $l_2$ from the lens array by the distance of $a_2$, $$a_2 = ](y_2 l_2)/(d_1 \mp y_2)] \tag{3}$$

Similarly, the distance $y_3$ between the two points projected on the photosensitive material for holography in the third step is represented by the formula:

$$y_3 = d_2 - [(l_4 - f_2)/(l_3 - f_2)] (d_2 - y_2) \tag{4}$$

where $f_2$ is the focal length of the second lens array, $l_3$ is the distance between the diffused screen and the second lens array in the second step, $d_2$ is the interval between the lens group of the second lens array, and $l_4$ is the distance between the lens array having the same performance as that of the second lens array and the photosensitive material for holography in the third step.

The depth of the object point reconstructed in the fourth step (assuming the reconstruction is formed at a position spaced apart from the position of the distance $l_4$ by the distance of $a_4$) is represented by $$a_4 = ](y_3 l_4)/(d_2 \mp y_2)] \tag{5}$$

From the formulae (1) to (5), $$y_3 = \pm d_2 \mp ](l_4 - f_2)/(l_3 - f_2)] [ (d_2 - d_1) + [(l_2 - f_1)/(l_1 - f_1)] \times [l_2/(l_1 \pm a_1)] d_1]$$

$$a_4 = l_4 \left[ \pm \frac{(l_3 - f_2) d_2}{l_4 - f_2} \times \frac{1}{(d_2 - d_1) + \frac{l_2 - f_1}{l_1 - f_1} \times \frac{l_1}{l_1 \pm a_1} d_1} \mp 1 \right] \tag{7}$$

This formula (7) is apparently not linear with respect to $a$. This means that the reconstruction space can be freely varied or distorted by varying the value of the parameters in the foregoing steps of the method of the present invention. For particular examples, the distortion of the reconstruction space will be seen as follows:

(Example I)
If, $$\begin{rcases} l_1 = l_2 = l_3 = l_4 \\ f_1 = f_2 \\ d_1 = d_2 \end{rcases} \tag{8}$$

from the formula (7)

$$a_4 = a_1 \tag{9}$$

is obtained, which means that $a_4$ is linear with respect to $a_1$ and the reconstruction is not distorted.

(Example II)
If, $$\begin{rcases} l_1 = l_2 = l_3 = l_4 \\ f_1 = f_2 \\ d_2 = M d_1 \end{rcases} \tag{10}$$

from the formula (7)

$$a_4 = \frac{a_2}{\left(1 \pm \frac{a_1}{l_1}\right) \times (M-1) + 1} \tag{11}$$

is obtained, which means that the reconstructed space can be distorted by various parameters. (In the formula (11), the minus sign shows the case where the object point is in front of the position of distance $l_1$ from the lens array by the distance of $a_1$.)

Figure 15:
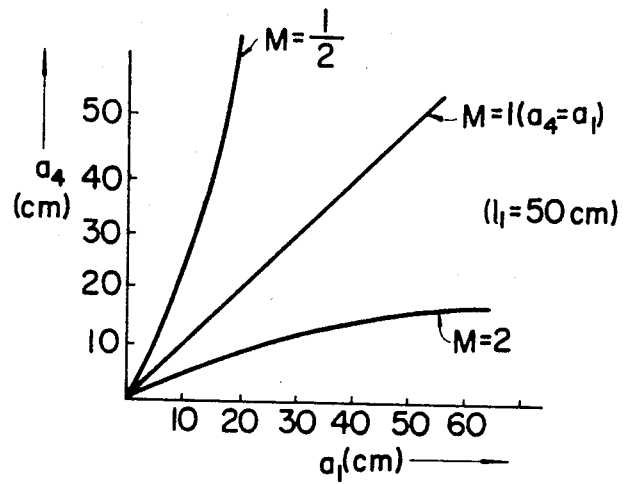
FIG. 15 is a graphic representation showing the relationship between $a_1$ and $a_4$ for various values of the parameter M when $l_1=l_2=l_3=l_4$, $f_1=f_2$, and $d_2=Md_1$.

FIG. 15 is a graphical representation showing the value of the $a_4$ in relation with $a_1$ when $M = 2$ and $M = \frac{1}{2}$. (The graph shows the case where the object point is behind the position of distance $l_1$ from the lens array.) From the graph, it is apparent that the space is contracted when $M > 1$ and expanded (feeling of three-dimensional effect emphasized) when $M < 1$.

Figure 16:
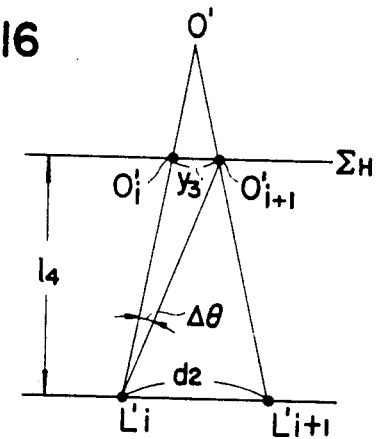
FIG. 16 is a geometric representation for explaining the discontinuity observed in the method of the present invention.

In the fourth step, the object point 0 is reconstructed on the photosensitive material for holography located at the position spaced apart from the viewpoint by the distance of $l_4$ as a number of points which can be seen with both eyes as a three-dimensional object point. In this case, the separation of the adjacent two points on the photosensitive material for holography causes a feeling of discontinuity as the eyes move. This can be explained with FIG. 16. When the viewpoint is moved from $L'_i$ to $L'_{i+1}$, the image of the object point reconstructed on the hologram surface $\Sigma H$ jumps from $0'_i$ to $0'_{i+1}$ abruptly, which causes a feeling of discontinuity in the observer's eyes. In order to prevent this phenomenon, it is necessary to make the angle between $L'_i 0'_i$ and $L'_i 0'_{i+1}$ smaller than the angular resolving power of eyes.

This discontinuity feeling can be eliminated if $$|y_3|/l_4 < \Delta \omega \tag{12}$$

In view of the formula (6), where $\Delta \omega$ is the angular resolving power of eyes. Accordingly, it is necessary to select the parameters so as to satisfy the condition of the formula (12). In practice, the object point projected is not reconstructed as a perfect point, but as a somewhat expanded point due to aberrations of the lens system and diffraction of the light at the apertures of the lenses. The conditions for eliminating the discontinuity feeling can be regarded as somewhat looser than the formula (12).

Generally, the object to be reconstructed into the three-dimensional image is not a point as discussed hereinabove, but a body having some expansion or size. Therefore, even if the discontinuity feeling due to that "jump" is eliminated, at one point, there occurs this "jump" at other points. Of course, it is desired to reduce said "jump" as far as possible in the vicinity of the point noticed in the object in case where an object having some size is reconstructed.

Now considering the case where the object point is on the plane $\zeta_p$ (focusing plane corresponding to the plane including the point noticed of the object, see FIG. 14), in the first step of the method of the present invention, the formula (6) becomes with $a_1 = 0$ $$y_3 = \pm d_2 \mp [(l_4 - f_2)/(l_3 - f_2)] (d_2 - d_1 + [(l_2 - f_1)/(l_1 - f_1)] d_1)$$

$$\tag{13}$$

which generally does not become zero. This means that there occurs said jump in the reconstructed image even if the object point is on the plane $\overline{\zeta_p}$. Therefore, it is required to reduce as much as possible the "jump" of the image in the reconstructor space with respect to the point noticed to obtain a three-dimensional image with little feeling of discontinuity. This is accomplished by the concept of a correction of distortion with moving the image plane which will be described hereinbelow.

Figure 17:
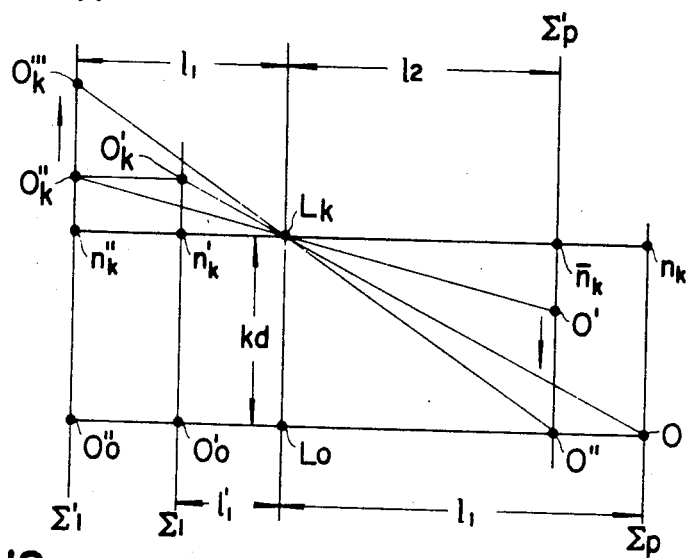
FIG. 17 is a geometric representation for explaining the amount of correction made in the case that a correction of distortion with moving the image plane is made.

Now referring to FIG. 17, noticing the central lens $L_o$ and the $k$-th lens $L_k$ in the lens array, we consider the case that the object point 0 at the intersection point of the optic axis of the lens $L_o$ and a plane $\Sigma_p$ at the distance of $l_1$ from the lens $L_o$ is photographed by the use of the first lens array (focal length $f_1$, interval between lenses $d_1$).

The image of the point 0 is recorded on the first photosensitive material at the position (plane $\overline{\zeta_1}$) spaced apart from the lens array by the distance of $l'_1$ as two points $0'_k$ and $0'_o$ by the lenses $L_o$ and $L_k$. Then, in order to make the focusing position of the lens array be on the plane $\overline{\zeta'_p}$ spaced apart from the lens by the distance of $l_2$, the first photosensitive material photographically processed, i.e., the first image matrix, is moved parallel to the position (plane $\overline{\zeta'_1}$) spaced apart from the lens array by the distance of $l'_2$. By illuminating the image matrix from the back side with diffused light, the images of the points $0''_k$ (same as the point $0'_k$) and $0''_o$ (same as the point $0'_o$) are projected on the plane $\overline{\zeta'_p}$ as the points $0''$ and $0'$ by the lenses $L_o$ and $L_k$, respectively. The length $0'0''$ is represented by, in view of the formula (2)

$$0'0'' = y_2 = \pm k d_1 (1 - [(l_2 - f_2)/(l_1 - f_1)]) \tag{14}$$

which generally does not become zero (when $l_1 = l_2$).

If the point $0''_k$ is then moved to the point $0'''_k$, the image of the point $0''_k$ on the plane $\overline{\zeta'_p}$ which is shown at $0'$ is superposed on the point $0''$, so that $y_2 = 0$. (where $0''$ is an intersection of the optical axis of the lens $L_o$ and the plane $\overline{\zeta'_p}$, and $0'''_k$ is an intersection of the plane $\overline{\zeta'_1}$ and the extension of a line including $L_k$ and $0'$.)

The length of movement $\Delta x$ is represented by $$\Delta x = \overline{0'''_k \; 0''_k} = k d_1 ([l'_2/l_2] - [l'_1/l_1])$$

$$\tag{15}$$

By substituting $l_1, l_2, f_1$ for $l'_2$ and $l'_1$, $$\Delta x = k \, d_1 f_1 \cdot [(l_1 - l_2)/(l_1 - f_1) (l_2 - f_1)]$$

$$\tag{16}$$

This result shows that it is possible to bring a plane having no "jump" of image into alignment with the plane $\overline{\zeta'_p}$ by moving laterally (in the direction in which the lenses of the lens array are arranged) the image corresponding to the $k$-th lens by the length $\Delta x$ represented by the formula (15) or (16). The length $\Delta x$ is linear with respect to $k$, and the images correspoding to the respective lenses of the lens array are recorded on a sheet of photosensitive material. Accordingly, in practical operation, the first image matrix is moved for the first lens from the central lens by the length $\Delta x_1$ represented by $$\Delta x_1 = d_1 ([l'_2/l_2] - [l'_1/l_1]) = d_1 f_1 [(l_1 - l_2)/(l_1 - f_1) (l_2 - f_1)]$$

$$\tag{17}$$

and is moved for the second lens by the same further length $\Delta x_1$. The lateral movement by the length is repeated in turn for the rest of the lenses.

Although the result obtained through the formula (15) and (16) is under a particular condition that the object point is on the optical axis of the lens $L_o$, it is easily proved that the image of the object point is projected as a point on the plane $\overline{\zeta'_p}$ wherever may be the object point on the plane $\overline{\zeta_p}$ if the image matrix is laterally moved by the length $\Delta x$ represented by the formulae (15) and (16) for the $k$-th image in general after focusing.

Now the position of the reconstructed image of the object point in general, in the case where a correction of distortion with moving the image plane has been effected, will be discussed.

Figure 18:
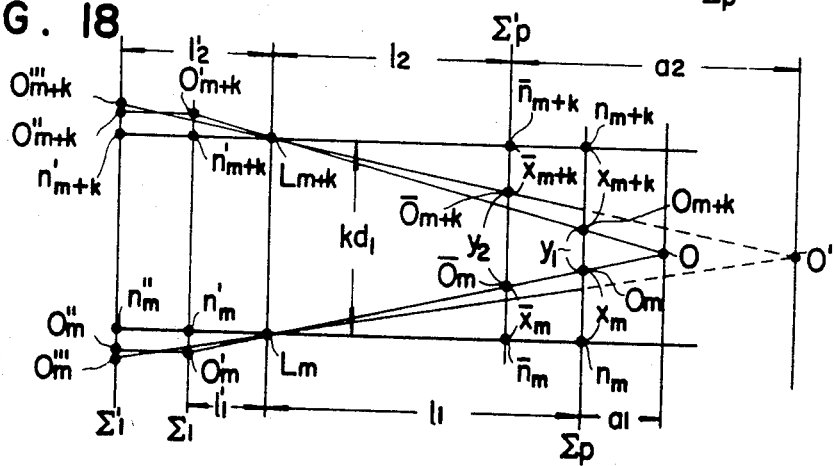
FIG. 18 is a geometric representation for explaining the reconstructed image space when a correction of distortion with moving the image plane is made in the method of the present invention.

Assuming now that, as shown in FIG. 18, the focusing position of the lenses (focal length $f_1$, interval between the adjacent lens $d_1$) constituting the first lens array is set to be at distance of $l_1$ (plane $\zeta_p$) and the object point $O$ spaced apart therefrom by the length of $a_1$ is taken by use of the first lens array, the object point $O$ is recorded on the first photosensitive material surface $\zeta_1$ (spaced apart from the lens array by the distance of $l'_1$) as two points $O'_m$ and $O'_{m+k}$ when noticing the $m$-th lens from the central lens and the $m+k$-th lens in the lens array.

By substituting the formula (18) for $y_2$ in the formula (20), $$y_3 = [(l_2 - f_1)/(l_1 - f_1)] \cdot [(l_4 - f_2)/(l_3 - f_2)] y_2 \tag{22}$$

By substituting the formula (22) for $y_3$ in the formula (21)

$$a_4 = \frac{l_4 d_1 (l_2 - f_1)(l_4 - f_2) a_1}{d_2 l_1 (l_1 - f_1)(l_3 - f_2) + a_1 [\pm (l_3 - f_2)(l_1 - f_1) d_2 \mp (l_4 - f_2)(l_2 - f_1) d_1]} \tag{23}$$

The first photoconductive material (the first image matrix) is photographically processed and placed on the plane $\zeta'_1$ (the plane $\zeta'_1$ corresponds to the fact that the focusing position of the lens is at the distance of $l_2$ from the lens), and further a correction of distortion with the movement of the image plane is made by moving laterally the image by $md_1$ ($[l'_2/l_2] - [l'_1/l_1]$) for the image corresponding to the $m$-th lens and by $(m+k)d_1$ ($[l'_2/l_2] - [l'_1/l_1]$) for the image corresponding to the $m+k$-th lens. Thereafter, the image matrix is illuminated from the back side with diffused light so that the image may be projected onto the diffused screen at a position spaced apart from the lens array by the distance of $l_2$ through the lenses $L_m$ and $L_{m+k}$. In this projection, two points $O'_m$ and $O'_{m+k}$ are projected as two points $\bar{O}_m$ and $\bar{O}_{m+k}$. The distance between the two points $y_2$ is represented by $$y_2 = [(l_2 - f_1)/(l_1 - f_1)] y_1 \tag{18}$$

where $y_1$ is the distance between two points $\bar{O}_m$ and $\bar{O}_{m+k}$ projected on the screen, when the first image matrix is placed at the same position as at the time of recording and the diffused screen is placed at the position of $\zeta_p$ and the points $O'_m$ and $O'_{m+k}$ are projected on the screen through the lenses $L_m$ and $L_{m+k}$.

If the object point projected is assumed to be at the position spaced apart by $a_2$ from the position of distance $l_2$ from the lens, $$a_2 = [(y_2 l_2)/(kd_1 \mp y_2)] \tag{19}$$

(The plus sign shows the technical case where the object point is in front of the plane of the distance of $l_2$ from the lens array.)

Similarly, the distance $y_3$ between the two images projected on the photosensitive material for holography after the correction of distortion with moving the image plane is made is represented by $$y_3 = [(l_4 - f_2)/(l_3 - f_2)] y_2 \tag{20}$$

where $f_2$ is the focal length of the second lens array, $l_3$ is the distance between the diffused screen and the second lens array in the second step, $d_2$ is the distance between adjacent lens groups in the second lens array, $l_4$ is the distance between the second lens array and the photosensitive material for holography in the third step. Assuming the three-dimensional image is reconstructed at a position spaced apart by $a_4$ from the position at distance of $l_4$ from the lens array, $$a_4 = [(y_3 l_4)/(kd_2 \mp y_3)] \tag{21}$$

In order to make the correction of distortion with moving the image plane in the third step, it is necessary to make a third image matrix which is made from the second image matrix through the correction of distortion with moving the image plane and then to use the third image matrix obtained thereby in the third step, since in the third step whole the image matrix should be projected at once. Since there are many difficulties in the correction of distortion with moving the image plane in the third step in general from the point of technical view, the correction of distortion with moving the image plane is preferred to be conducted in the second step in most cases.

As apparent from the formula (23), $a_4$ is not in general linear with respect to $a_1$. This shows that distortion is made in the reconstructed space by the correction of distortion with moving the image plane.

The above-described technique of the correction of distortion with moving the image plane is inevitably necessary for varying the magnification of the reconstructed space and for emphasizing or reducing the stereoscopic effect in carrying out the present invention. Further, these methods are able to be applied not only to the first embodiment of the invention but also to other embodiments of the present invention as well.

Now the type of the first and second photosensitive material used in the first and second steps of the method of the present invention will be mentioned.

The image finally reconstructed in the reconstructed space by the image hologram is required to be a positive image. Since the holographic system is of a positive type regardless of the type of the photosensitive material for holography, it is required in essence that the image recorded on the second photosensitive material (the second image matrix) should be positive. In order that the second image matrix is of positive image, it is required to use negative type photosensitive material for both the first and second photosensitive material or use positive type for both the first and second photosensitive material. In view of the ease in handling or processing, resolution, stability and the like, it is apparent that it is more advantageous to use negative type photosensitive material for both the first and second photosensitive material. It is one of the features of the present invention that the three-dimensional image can be reconstructed in positive image just by using negative type photosensitive material including the photosensitive material for holography.

The explanation and description of the first embodiment is completed here. It should be noted that the various methods described hereinabove are applicable not only to the first embodiment but also to other embodiments of the present invention.

SECOND EMBODIMENT

The second embodiment relates to a method of forming colored three-dimensional image and comprises the following four steps:

First Step

A plurality of lenses having as high performance as that of the photographic lens are arranged in one direction with equal intervals to form a lens array having a length in one direction (first lens array). By use of this lens array, a series of images of different viewpoints of an object illuminated by incoherent light are recorded on a black and white photosensitive material through color separation. The photosensitive material exposed is photographically processed to obtain several sheets of the first color separated image matrix.

Second Step

The respective images recorded on one sheet of the first color separated image matrix obtained through the first step are projected one by one in turn on a diffused screen through a lens array having the same performance as that of the lens array used in the first step to obtain the image matrix. At the same time, the image on the diffused screen is recorded on the second black and white photosensitive material one by one in turn through a lens array (second lens array) arranged in matrix pattern. The recording of the image is made so that a correspondence is effected in such a way that one lens in the first lens array corresponds to a lens group consisting of a plurality of lenses arranged in one direction (direction perpendicular to the direction in which the lenses of the first lens array are arranged) in the second lens array. By such an operation, a plurality of identical images are arranged in one direction on the second photosensitive material.

Such an operation as described above is repeated for different second photosensitive materials with respect to all the sheets of the first color separated image matrix. Through a photographic process of the several sheets of the second photosensitive material exposed, the same number of sheets of the second color separated image matrix as the number of the first color separated image matrix sheets are obtained.

Third Step

One sheet of the several second color separated image matrix obtained through the second step is illuminated by laser light from the back side and the images thereon are projected on a photosensitive material for holography through a lens array arranged in matrix pattern having the same performance as that of the lens array (second lens array) used in the second step. The photosensitive material for holography is located at the position in the vicinity of the real image of the image matrix, and the images projected thereon are recorded thereon as an image hologram by means of the reference light which is coherent with the illumination light. Such an operation is repeated for every sheet of the second color separated image matrix obtained through the second step without changing the photosensitive material for holography. In this operation, the direction of the incident light of the reference light to the photosensitive material for holography is changed for every color-separated image matrix. After a photographic process of the photosensitive material exposed, one sheet of image hologram having a plurality of images superposed thereon is obtained.

Fourth Step

The image hologram obtained through the third step is illuminated by incoherent white light source having expansion through color filters from the different directions with respect to the color. The incoherent light is illuminated from the opposite direction to that of the reference light used in the third step. This incoherent light is illuminated simultaneously for every color, and superposed real images of the lens array are reconstructed. The three-dimensional color image can be observed from the position in the vicinity of the real images of the lens array with eyes.

Now, each of the above steps of the second embodiment will be described with reference to the drawing.

For the sake of simplification, the following description will be made with particular reference to three primary colors reconstruction. Of course, the same or similar method can be applied to the reconstruction with more colors.

Figure 19:
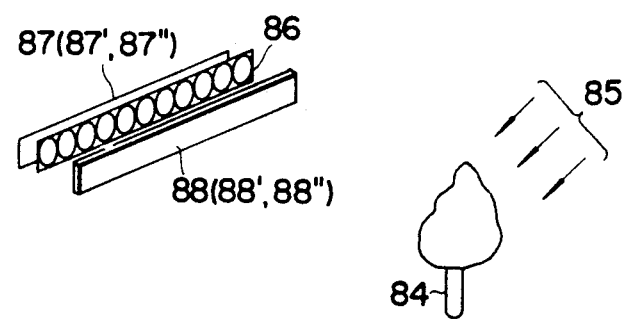
FIG. 19 is a perspective view showing the arrangement in which the first step of the method in accordance with the second embodiment of the present invention is carried out.

FIG. 19 shows an arrangement of the image forming system for carrying out the first step of the second embodiment of the present invention. In the drawing, FIG. 19, the reference numeral 84 shows an object to be reconstructed into a three-dimensional image, 85 shows incoherent light illuminating the object 84, 86 shows a lens array (first lens array) consisting of a plurality of lenses having as high performance as that of photographic lenses arranged at equal intervals in a direction (in a horizontal direction in the drawing), 87 shows a black and white photosensitive material placed behind the lens array 86 at the focusing position of the object image (first photosensitive material), and 88 shows a color filter located in front of the lens array 86 through which the light from the object 84 reaches the lens array 86.

As the color filter, three kinds of filters of blue, green and red (88, 88', 88'', respectively) are used.

In the arrangement shown in FIG. 19, first only the blue filter 88 is used as the filter and the photosensitive material 87 is used for recording a series of blue images of different viewpoints. Then, the filter is changed to the green filter 88' and the photosensitive material is changed to a new one 87'. On this new photosensitive material 87' are recorded a series of green images of different viewpoints. The same operation is conducted with the red filter 88'' and the photosensitive material 87''. The three sheets of exposed photosensitive material 87, 87', 87'' are photographically processed and three sheets of first color separated image matrix are obtained.

The second step of the second embodiment of the present invention can be carried out employing the same arrangement as that used in the second step in the first embodiment. (Reference should be had to FIG. 2) Explaining the second step of the second embodiment of the invention referring to FIG. 2, one of the first color separated image matrix obtained through the first step is placed at the position of the first image matrix 6 in FIG. 2, and the image thereon is recorded on the second photosensitive material placed at the position of the second photosensitive material 12 in FIG. 2. In order to record the first image matrix on the second photosensitive material, the same operation as that of the second step of the first embodiment may be conducted. The similar operation is repeated for every color-separated image changing the second photosensitive material. Thus, the three sheets of the first color-separated image matrix are recorded on the three sheets of the second photosensitive material. After the photographic process, three sheets of the second color-separated image matrix are obtained.

Figure 20:
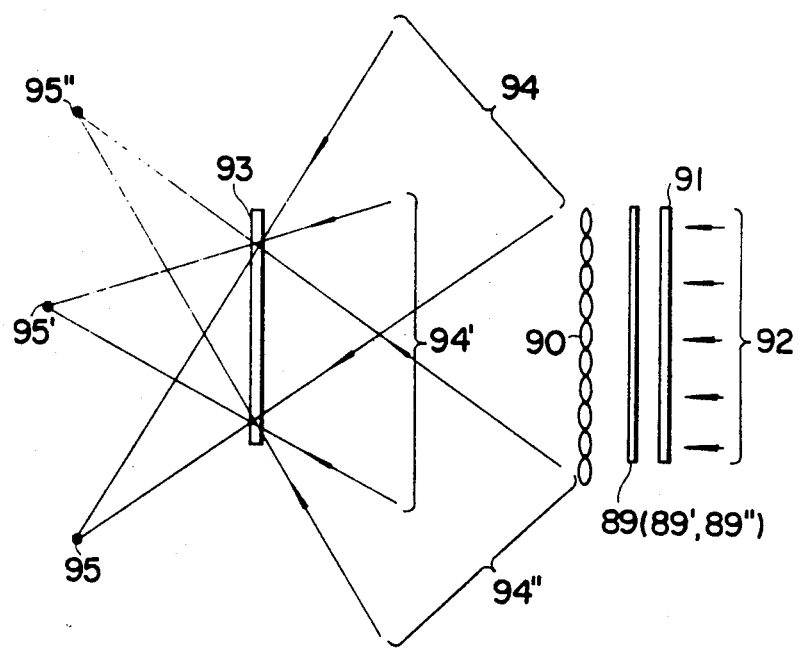
FIG. 20 is a plan view showing the arrangement in which the third step of the method in accordance with the second embodiment of the present invention is carried out.

FIG. 20 shows an arrangement for carrying out the third step of the second embodiment of the present invention. In the drawing, FIG. 20, the reference numerals 89, 89', 89'' show the second color-separated image matrix obtained through the second step, 90 shows a lens array of matrix pattern having the same performance as that of the second lens array used in the second step, 91 shows a diffused plate for giving diffused illumination to the second color-separated image matrix, 92 shows laser light for illumination, 93 shows a photosensitive material for holography, 94, 94', 94'' show laser light for reference light which is in coherent relation with the laser light 92 for illumination, and 95, 95', 95'' show points to which the laser light 94, 94' and 94'' are concentrated. The reference laser light 94' is illuminated onto the photosensitive material for holography 93 from this side of the drawing sheet.

In the arrangement shown in FIG. 20, one of the second color-separated image matrix 89 is located at the same relative position to the matrix lens array 90 as that at the time of recording in the second step. Further, behind the image matrix is placed a diffused plate 91, which is, in turn, illuminated by laser light 92. The second color-separated image matrix 98 illuminated by the diffused laser light is projected forwardly by means of a lens array 90. Then, a photosensitive material for holography 93 is placed in the vicinity of the focusing position of the second color-separated image matrix 89 formed through the lens array 90, and the images of the second color-separated image matrix 89 are recorded on the photosensitive material for holography 93 as an image hologram in cooperation with the reference light of the laser light 94 concentrating into a point 95. Thereafter, with the photosensitive material for holography 93 held in its position, the second color-separated image matrix 89 is replaced by another sheet of the second color-separated image matrix 89', and the images of the second color-separated image matrix 89' are recorded on the photosensitive material for holography 89' by the use of the laser light 94' concentrating into the point 95' as the reference light. Thus, the images of the second color-separated image matrix 89' are superposedly recorded on the photosensitive material 93 as an image hologram together with the image of the said matrix 89. Finally, the third color-separated image matrix 89'' is recorded on the photosensitive material for holography 93 similarly to the foregoing steps. Thus, after all the operations are completed, the photosensitive material exposed 93 is processed photographically to obtain a sheet of image hologram bearing records triple-superposed incoherently.

Figure 21:
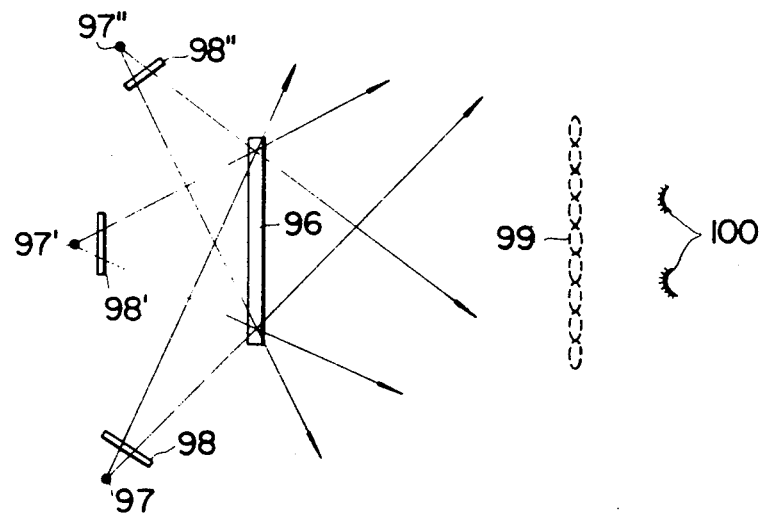
FIG. 21 is a plan view showing the arrangement in which the fourth step of the method in accordance with the second embodiment of the invention is carried out.

FIG. 21 shows an arrangement for carrying out the fourth step of the second embodiment of the method of the present invention. In the drawing, FIG. 21, the reference numeral 96 shows an image hologram obtained through the third step of the second embodiment of the invention, 97, 97', 97'' show incoherent white light source having expansion used for reconstruction of the image, 98, 98', 98'' show blue, green and red filters, respectively, 99 shows a real image of the matrix lens array reconstructed by the image hologram in which three real images of different colors are superposed, and 100 shows the position of the viewpoint. In this arrangement, if the image hologram 96 is simultaneously illuminated with incoherent white light sources having expansion 97, 97', 97'' through color filters 98, 98', 98'', such that said incoherent light is diverged from the concentration point of the reference light used at the time of recording the hologram (corresponding to the points 95, 95', 95'' in FIG. 20), three superposed real images of different color of the lens array are reconstructed at the position which corresponds to the position of the lens array used in the third step. By locating the viewpoints or eyes in the vicinity of the real image of the lens array, the three color-separated images of the viewpoint corresponding to the position of the eyes can be observed at a time. Consequently, a color image having the same color as that of the original object can be observed. Further, by viewing the image with both eyes, a three-dimensional color image can be observed since the respective eyes see the image of the viewpoint corresponding to the position of the respective eyes. Furthermore, by moving the eyes to right and left, the three-dimensional color image can be seen varying its appearance as it naturally appears in the sense of parallax.

The relative position of the incoherent white light or incandescent light to the image hologram in the fourth step is determined as follows. Between the mean incident angle $\theta$ of the reference laser light (wavelength $\lambda$) to the hologram and the mean incident angle $\theta$ of the illumination light for reconstruction (wavelength $\lambda'$) to the hologram, there is such a relationship as follows:

$$\sin \theta = \lambda'/\lambda \sin \theta \tag{24}$$

(wherein it is assumed that the object light is incident to the hologram surface at substantially right angle, and the diffracted light is also considered to advance from the hologram plane at substantially right angle.)

Accordingly, in order that the real image of the lens array reconstructed in the fourth step is reconstructed in the right position, it is necessary to determine the position of the incoherent white light sources 97, 97', 97'' so that the formula (24) may be satisfied in view of the wavelength transparent through the color filters 98, 98' and 98''.

Figure 22:
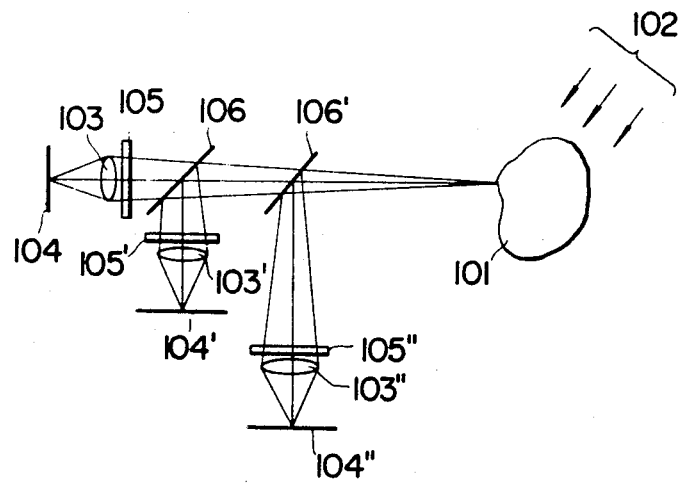
FIG. 22 is a plan view showing the arrangement of the optical elements in which the first step of the method in accordance with the second embodiment of the present invention is carried out.

In the first step of the second embodiment of the present invention, it is not possible to record and reconstruct a moving object with the arrangement shown in FIG. 19 for taking a series of color-separated images of the object with different viewpoints. For recording a moving object, such an arrangement as shown in FIG. 22 can be employed. In the drawing, FIG. 22, the reference numeral 101 shows a moving object to be recorded and reconstructed, 102 shows incoherent light illuminating the object, 103, 103', 103'' show lens arrays (first lens array) consisting of lenses arranged in a direction (in the direction perpendicular to the drawing sheet in FIG. 22) having as high performance as that of the photographic lens and having the same performance as each other, 104, 104', 104'' show black and white photosensitive materials behind the lens arrays 103, 103', 103'' at the focusing position thereof respectively, 105, 105', 105'' show blue, green and red color filters, respectively, and the reference numerals 106 and 106' show half mirrors having proper reflectance. The lens arrays 103' and 103'' are located so that the virtual image of the lens arrays 103' and 103'' formed by the half mirrors 106 and 106' may be in alignment with the lens array 103.

With such an arrangement as described above, the first color-separated image matrix of the moving object can easily be obtained. Of course, it is possible to apply such an arrangement to a still object. (The color filters 105, 105' and 105'' can be eliminated by making the half mirror 106 and 106' have particular spectral reflectance in the arrangement shown in FIG. 22.) The laser light used in the third step of the second embodiment of the invention may be one which has one wavelength or one which has more than one different wavelengths.

For instance, in the arrangement shown in FIG. 20, the second color separated image matrix 89 corresponding to the blue color separation is recorded as a hologram by means of blue laser light 92 as illumination light and coherent blue laser light 94 as reference light, and then the image matrix 89 is replaced by the second color separated image matrix 89' corresponding to the green color separation, thereby recording the second color separated image matrix 89' as a hologram superposed on the hologram for green color separation image by means of green laser light 92' (not shown) as illumination light and coherent green laser light 94' as reference light. Finally, the image matrix 89' is replaced by the second color-separated image matrix 89'' corresponding to the red color separation, thereby recording the second color-separated image matrix 89'' as a hologram superposed further on the holograms for blue and green color separation by means of red laser light 92'' (not shown) as illumination light and coherent red laser light 94'' as reference light. Thus, an image hologram bearing records triple-superposed is obtained.

Since the focusing position and magnification of the real image of the lens array reproduced in the fourth step are somewhat different according to the wavelength ratio of the recording light to the reproducing light of the hologram, it is preferred to use laser lights of three different wavelengths of blue, green and red.

THIRD EMBODIMENT

The third embodiment relates to a method of forming colored three-dimensional images similarly to the second embodiment, and comprises the following four steps:

First Step

A plurality of lenses having as high performance as that of the photographic lens are arranged in one direction with equal intervals to form a lens array having a length in one direction (first lens array). By use of the first lens array, a series of images of different viewpoints of an object illuminated by incoherent light are recorded on a black and white photosensitive material through the color separation method. The photosensitive material exposed is photographically processed to obtain several sheets of the first color-separated image matrix.

Second Step

The respective images recorded on one sheet of the first color-separated image matrix obtained through the first step are projected one by one, in turn, on a diffused screen through a lens array having the same performance as that of the lens array used in the first step and a color filter. Simultaneously, the image on the diffused screen is recorded on the second color photosensitive material one by one in turn through a lens array (second lens array) arranged in a matrix pattern. The recording of the image is so made that there is a correspondence such that one lens in the first lens array corresponds to a lens group consisting of a plurality of lenses arranged in one direction (direction perpendicular to the direction in which the lenses of the first lens array are arranged) in the second lens array. By such an operation, a plurality of identical images are arranged in one direction on the second photosensitive material.

Such an operation as described above is repeated on the same second photosensitive material for all the sheets of the first color separated image matrix. Through a photographic process of the second color photosensitive material on which the color separated images are superposedly recorded, one sheet of the second color-separated image matrix is obtained.

Third Step

The second color-separated image matrix obtained through the second step is illuminated by laser light from the back side and the images thereon are projected on a photosensitive material for holography through a lens array arranged in a matrix pattern having the same performance as that of the lens array (second lens array) used in the second step. The photosensitive material for holography is located at the position in the vicinity of the real image of the image matrix, and the images projected thereon are recorded thereon as an image hologram by means of the reference light which is coherent with the illumination light. Such an operation is repeated with the same second color-separated image matrix and the photosensitive material for holography for the different laser lights having different wavelengths of the number of the color separation. In this operation, the wavelength of the laser lights should correspond to the "color" of the color separation made in the first step, and the direction of the incident light of the reference light to the photosensitive material for holography is charged for every wavelength of the laser light used. Through a photographic process of the photosensitive material for holography after exposure, one sheet of image hologram having a plurality of images superposed thereon is obtained.

The exposure on the photosensitive material for holography may be conducted in such a way that the second color-separated image matrix is simultaneously illuminated by several different laser lights for illumination having different wavelength, and simultaneously the photosensitive material for holography is illuminated by several coherent reference lights having different wavelength from different directions at a time.

Fourth Step

The image hologram obtained through the third step is illuminated by incoherent white light source having expansion through color filters from the different direction with respect to the color. The incoherent light is illuminated from the direction opposite to that of the reference light used in the third step. This incoherent light is simultaneously illuminated for every color, and superposed real images of the lens array are reconstructed. The three dimensional color images can be observed from the position in the vicinity of the real images of the lens array with eyes.

Each step of the third embodiment of the method of the present invention as described hereinabove will now be described in detail referring to the drawing. For the sake of simplification, the following explanation and description will be made with particular reference to the case where the color recording is made by means of three primary colors separation method. Of course, the similar method can be applied to the case where more than three primary colors are used.

The first step of the third embodiment of the invention can be carried out using the same arrangement as that of the first step of the second embodiment (shown in FIGS. 19 and 22) and through the same operation.

Figure 23:
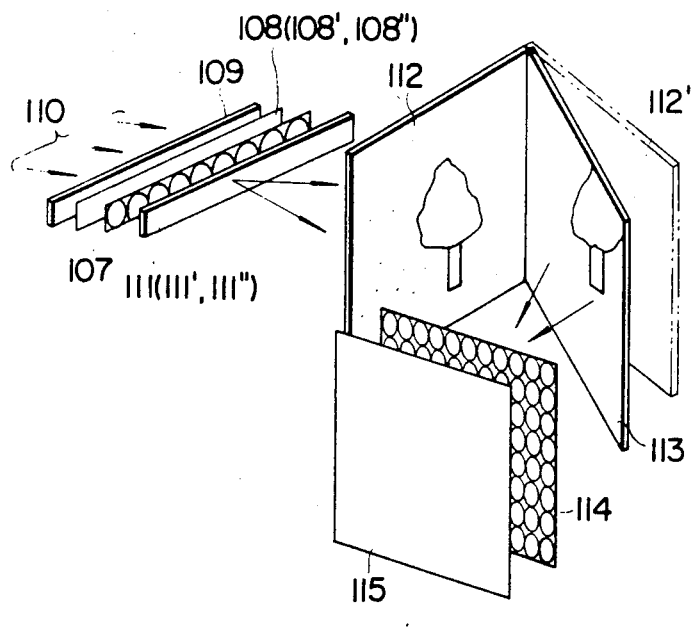
FIG. 23 is a perspective view showing the manner in which the second step of the method in accordance with the third embodiment of the present invention is carried out.

An arrangement of the image forming system for carrying out the second step of the thrid step is shown in FIG. 23. In the drawing, FIG. 23, the reference numeral 107 shows a lens array having the same performance as that of the lens array used in the first step, 108 (108', 108'') shows a first color separated image matrix obtained through the first step, 109 shows a diffused plate for making diffused illumination, 110 shows incoherent white light for illuminating the first color-separated image matrix, 111, 111' and 111'' show blue, green and red color filters, 112 shows a diffused screen, 113 shows a plane mirror, 112' shows a virtual image of the diffused screen 112 formed by the plane mirror 113, 114 shows a lens array (second lens array) consisting of lenses having as high performance as that of the photographic lens arranged in matrix pattern at equal intervals, and 115 shows a second color photosensitive material located behind the second lens array at the focusing position of the diffused screen image.

In the arrangement shown in FIG. 23, the first color separated image matrix 108 corresponding to blue is projected on the diffused screen through a lens array 107 and the blue filter 111, and the image on the diffused screen is recorded on the second color photosensitive material through the second lens array 114. The recording of the image can be conducted similarly to the operation in the second step of the first embodiment. Then, the first color-separated image matrix 108' corresponding to green is projected onto a diffused screen through a lens array 107 and the green filter 111', and the image on the diffused screen is recorded on the second color photosensitive material superposedly on said image through the second lens array 114. A similar operation is conducted for the first color-separated image matrix 108'' corresponding to red through the lens array 108 and the red filter 111'', and the second color photosensitive material is exposed thrice to have a triple image thereon. The second color photosensitive material exposed thrice is then photographically processed so that a sheet of second color image matrix is obtained.

Although, in the arrangement shown in FIG. 23, the color filters 111, 111' and 111'' are provided between the diffused screen and the lens array 107, this is not essential and the filters may be located at any position on the optical path to the second color photosensitive material 115. In such a case, of course, the variation occurring in the focusing position caused by the insertion of the filter and size of the filter should be taken into consideration.

The arrangement shown in FIG. 23 is suitable for carrying out the second step, especially for the first image matrix obtained through the arrangement shown in FIG. 19 in the first step. If the first color-separated image matrix is obtained through the arrangement shown in FIG. 22 in the first step, it is necessary to use a mirror in the second step in order to obtain a right image projected on the diffused screen.

The third step of the third embodiment can be carried out with the same arrangement (shown in FIG. 20) as that used for carrying out the third step of the second embodiment of the invention.

It should be noted that three kinds of laser light having different wavelengths corresponding to blue, green and red, are required in this case.

In the arrangement shown in FIG. 20, the second color image matrix obtained through the second step is placed at the position shown at 89 and is illuminated by blue laser light 92. By the blue laser light 92 in cooperation with coherent blue reference light 94, blue color-separated images of the second color image matrix are recorded on the photosensitive material for holography 93 as an image hologram.

Then, with the second color image matrix held at the position, green laser light 92' (not shown) is illuminated on the second color image matrix and the green color-separated images of the second color image matrix are superposedly recorded on the photosensitive material for holography, on which said blue color separated images are recorded, as an image hologram in co-operation with green reference light 94' which is coherent with the green laser light 92'. Finally, red laser light 92'' also not shown and coherent red reference laser light 94'' are used in a similar operation and the red color-separated images are further superposed on the previously produced blue and green color separated images recorded on the photosensitive material for holography 93 as an image hologram bearing records triple-superposed. Through a photographic process of the photosensitive material for holography, a sheet of image hologram is obtained.

The photosensitive material for holography may be exposed to the different colors of laser lights once for every light, three times in total, or may be exposed once to the three laser lights simultaneously. That is, in the latter case, the second color image matrix is simultaneously exposed to the blue, green and red laser lights 92, 92' and 92'', and exposed to the blue, green and red reference laser lights 94, 94' and 94'' at the same time.

The fourth step of the third embodiment of the present invention can be carried out by the same operation and with the same arrangement (shown in FIG. 21) as that of the fourth step of the second embodiment of the invention.

Fourth Embodiment

The fourth embodiment of the present invention relates to a method of forming a three-dimensional color image same as the foregoing second and third embodiment thereof, which comprises four steps as follows:

First Step

A plurality of lenses having as high performance as that of the photographic lens are arranged in one direction with equal intervals to form a lens array (first lens array) having a length in one direction. By use of the first lens array, a series of images having differenet viewpoints are recorded on a sheet of color photosensitive material. The color photosensitive material exposed is photographically processed to obtain one sheet of the first color image matrix.

Second Step

The respective images recorded on the first color image matrix obtained through the first step are projected one by one in turn on a diffused screen through a lens array having the same performance as that of the lens array used in the fist step to obtain the first image matrix. At the same time, the image on the diffused screen is recorded on the second black and whilte photosensitive material one by one in turn through a lens array (second lens array) arranged in matrix pattern. In this operation, color separation filters are inserted in the optical path from the diffused screen and the photosensitive material. The recording of the image is made so that a correspondence may be made in such a way that one lens in the first lens array corresponds to a lens group consisting of a plurality of lenses arranged in one direction (direction perpendicular to the direction in which the lenses of the first lens array are arranged) in the second lens array. By such an operation as described above, a plurality of identical images are arranged in one direction on the second photosensitive material.

A series of such photosensitive are repeated with the first color image matrix unchanged with changed color separation filters and changed second black and white photosensitive material. This is repeated for every color of filters corresponding to the number of colors of color separation. Through a photographic process of the several sheets of the second black and white photosensitiv material exposed, the same number of sheets of the second color separated image matrix are obtained.

Third Step

One of the several sheets of the second color separated image matrix obtained through the second step is illuminated by laser light from the back side and the images thereon are projected on a photosensitive material for holography through a lens array arranged in matrix pattern having the same performance as that of the lens array (second lens array) used in the second step. The photosensitive material for holography is located at the position in the vicinity of the real image of the image matrix, and the images projected thereon are recorded as an image hologram by means of a reference light which is coherent with the illumination light. Such an operation is repeated for every sheet of the second color-separated image matrix obtained through the second step without changing the photosensitive material for holography. In this operation, the direction of the light of the reference light incident to the photosensitive material for holography is changed for every color-separated image matrix. Through a photographic process of after exposure, one sheet of image hologram having a plurality of image superposed thereon is obtained.

Fourth Step

The image hologram obtained through the third step is illuminated by incoherent white light source having expansion through color filters from the different direction with respect to the color. The incoherent light is illuminated from the opposite direction to that of the reference light used in the third step. This incoherent light is simultaneously illuminated for every color, and superposed real images of the lens array are reconstructed. The three-dimensional color image can be observed from the position in the vicinity of the real images of the lens array with both eyes.

Now, each of the above described steps of the fourth embodiment of the invention will be described referring to the drawing.

For the sake of simplification, the following description will be made with particular reference to three primary color separation method. Of course, the method can be applied to other methods with color separation based on more than three colors.

The first step of the fourth embodiment can be carried out with the same operation and with the same arrangement (shown in FIG. 1) as that used in the first step of the first embodiment.

However, in the fourth embodiment, it is necessary to use a color photosensitive material instead of the black and white photosensitive material 4 used in FIG. 1. Through a photographic process of the color photosensitive material exposed in the arrangement shown in FIG. 1, a series of color images of different viewpoints, namely, the first color image matrix, are obtained.

Figure 24:
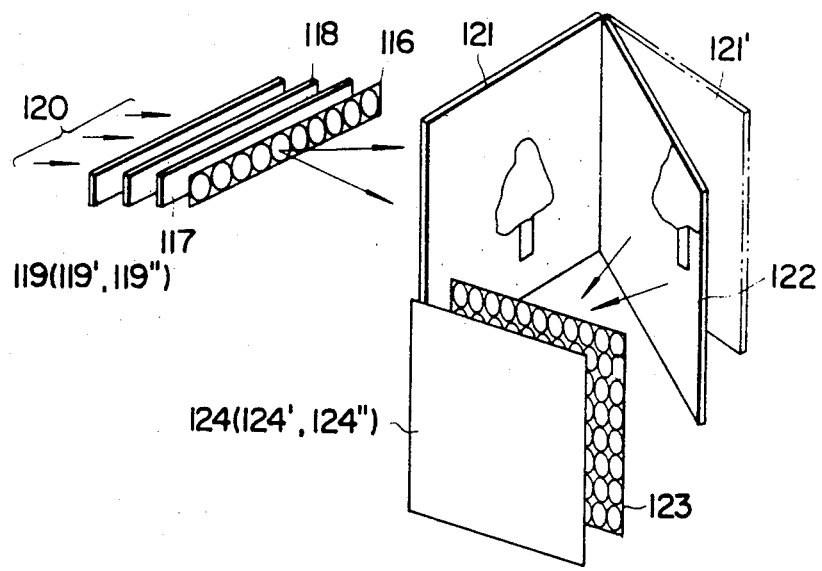
FIG. 24 is a perspective view showing the manner in which the second step of the method in accordance with the fourth embodiment of the present invention is performed.

FIG. 24 shows an arrangement for carrying out the second step of the fourth embodiment of the invention. In the drawing, FIG. 24, the reference numeral 116 shows a lens array having the same performance as that of the lens array used in the first step, 117 shows the first color image matrix obtained through the first step, 118 shows a diffused plate for making diffused illumination, 119 (119' and 119'') shows a color separation filter, 120 shows incoherent white light for illuminating the first color image matrix 117, 121 shows a diffused screen, 122 shows a plane mirror, 121' shows a virtual image of the diffused screen 121 formed by the plane mirror 122, 123 shows a lens array (second lens array) consisting of lenses arranged in matrix pattern at equal intervals having as high performance as that of the photographic lens, and 124 (124' and 124'') shows a second photosensitive material located behind the second lens array at the focusing position of the diffused screen image.

In the arrangement as shown in FIG. 24, firstly, the first color image matrix 117 is illuminated with blue light through the blue color separation filter 119, and the blue color-separated image of the firt color image matrix is recorded on the second black and white photosensitive material 124. In order to record the first image matrix on the second photosensitive material, the same operation as that of the second step of the first embodiment can be conducted. Then, the green color-separated image of the first color image matrix is recorded on the changed new second photosensitive material 124' with the changed green color separation filter 119'.

Finally, the filter is further changed to the red color separation filter 119'' and the second photosensitive material is also changed to a new one 124'', and the same operation is repeated thereby. Thus, three photosensitive materials are exposed to three colors of image. Through a photographic process of the photosensitive materials, three sheets of the second color-separated image matrix are obtained.

The obtained step of the fourth embodiment of the present invention is the step for obtaining one sheet of image hologram from the three sheets of the second color-separated image matrix botained through the second step, and can be carried out by the same operation and with the same arrangement (shown in FIG. 20) for the third step of the second embodiment. Of course, it should be understood that only one laser light of one wavelength may be used as the third step of the second embodiment or three laser lights of three different wavelengths may be used with respect to the respective color-separated images.

The fourth step of the fourth embodiment of the invention can be carried out by the same operation and with the same arrangement (shown in FIG. 21) as that for the fourth step of the second embodiment.

FIFTH EMBODIMENT

The fifth embodiment of the present invention relates to a method of forming a three-dimensional color image similarly to the foregoing second, thrid and fourth embodiments, which comprises four steps as follows:

First Step

A plurality of lenses having as high performance as that of the photographic lens are arranged in one direction with equal intervals to form a lens array (first lens array) having a length in one direction. By use of the first lens array, a series of images having different viewpoints are recorded on one sheet of color photosensitive material. The color photosensitive material is photographically processed to obtain one sheet of the first color image matrix.

Second Step

The respective images recorded on the first color image matrix obtained through the first step are projected one by one in turn on a diffused screen through a lens array having the same performance as that of the lens array used in the first step to obtain the first image matrix. At the same time, the image on the diffused screen is recorded on the second color photosensitive material one by one in turn through a lens array (second lens array) arranged in matrix pattern. In this operation, the recording of the image is so made that there is correspondence between the lenses in the first and second lens array in such a way that one lens in the first lens array corresponds to a lens group consisting of a plurality of lenses arranged in one direction (direction perpendicular to the direction in which the lenses of the first lens array are arranged) in the second lens array. By such as an operation as described above, a pluraity of identical images are arranged in one direction on the second photosensitive material.

Through a photographic process of the second color photosensitive material one sheet of a color image matrix is obtained.

Third Step

The second color separated image matrix obtained through the second step is illuminated by laser light from the back side and the images thereon are projected on a photosensitive material for holography through a lens array arranged in a matrix pattern having the same performance as that of the lens array (second lens array) used in the second step. The photosensitive material for holography is located at the position in the vicinity of the real image of the image matrix, and the images projected thereon are recorded as an image hologram by means of reference light which is coherent with the illumination light. Such an operation is repeated with the same second color-separated image matrix and the photosensitive material for holography for the different laser lights having different wavelength of the number of the color separation. In this operation, the wavelength of the laser light should correspond to the color of the color separation and the direction of the incident light of the reference light to the photosensitive material for holography is changed for every wavelength of the laser light used. Through a photographic process of the photosensitive material for holography after exposure, one sheet of image hologram having a plurality of images superposed thereon is obtained.

The exposure on the photosensitive material for holography may be conducted in such a way as that the second color-separated image matrix is illuminated by several different laser lights for illumination having different wavelength at a time and simultaneously the photosensitive material for holography is illuminated by several coherent reference lights having different wavelength from different directions at a time.

Fourth Step

The image hologram obtained through the third step is illuminated by an incoherent white light source having expansion through color filters from the different directions with respect to color. The incoherent light is illuminated from the opposite direction to that of the reference light used in the third step. This incoherent light is simultaneously illuminated for every color, and superposed real images of the lens array are reconstructed. The three-dimensional color image can be observed from the position in the vicinity of the real images of the lens array with both eyes.

Each step of the fifth embodiment of the method of the present invention as described hereinabove will now be described in detail referring to the drawing. For the sake of simplification, the following explanation and description of the steps will be made with particular reference to the case where the color reproduction is made with the three color separation method. Of course, a similar method can be applied to the case where more than three primary colors are used.

The first step of the fifth embodiment of the invention can be carried out by the same operation and with the same arrangement (shown in FIG. 1) as that employed in the first step of the first embodiment like the fourth embodiment.

However, it is necessary in the fifth embodiment to use a color photosensitive material instead of the black and white photosensitive material 4 used in the first embodiment. Through a photographic process of the color photosensitive material exposed in the arrangement shown in FIG. 1, a series of color images having different viewpoints, namely, a first color image matrix, is obtained.

The second step of the fifth embodiment can be carried out by the same operation and with the same arrangement (shown in FIG. 2) as that employed in the second step of the first embodiment. Instead of the black and white photosensitive material 12 shown in FIG. 2, however, in the fifth embodiment, it is necessary to use a color photosensitive material. Further, the incoherent light 8 should be white light, which is not necessary in the first embodiment.

Through a photographic process of the second color photosensitive material exposed in the arrangement shown in FIG. 2, the second color image matrix is obtained.

The third step of the fifth embodiment of the present invention is carried out by the use of the same arrangement (shown in FIG. 20) used for carrying out the third step of the third embodiment thereof and by the same operation as that of the third step of the third embodiment.

The fourth step of the fifth embodiment of the present invention can be carried out by the same operation and with the same arrangement (shown in FIG. 21) as that employed in the fourth step of the second embodiment.

While several embodiments of the present invention have been described in the foregoing specification and illustrated in the accompanying drawings in connection with a specific purpose, it will be apparent that various variations and modifications may be made by those skilled in the art without departing from the spirit and scope of the invention. It is not intended, therefore, that the present invention shall be limited to the embodiments shown nor otherwise than by the terms of the appended claims.

What is claimed is:

1. A method of forming three-dimensional images comprising the steps of:
   1. obtaining at least one first image matrix comprising a series of images of different viewpoints of an object illuminated by incoherent light by use of a first lens array comprising a plurality of lenses arranged in one direction at equal intervals and a first photosensitive material positioned to receive said images;
   2. projecting each image of said first image matrix on a diffuser screen one by one in turn through a second lens array having the same performance characteristics as those of said first lens array;
   3. obtaining at least one second image matrix on a second photosensitive material by recording the images of said first image matrix as each image of said first image matrix is projected on said diffuser screen, this step being accomplished by use of a third lens array comprising a plurality of lenses arranged in a two-dimensional matrix pattern, there being correspondence between said first and second image matrices in such a way that one image of said first image matrix corresponds to one group of said second image matrix, said group being arranged in a direction perpendicular to the direction in which the images of said first image matrix are arranged;
   4. illuminating said second image matrix from the back side thereof with at least one first source of coherent light, and focusing said second image matrix with a fourth lens array having the same performance characteristics as those of said third lens array onto a third photosensitive material for forming a holographic object beam, while simultaneously
   5. illuminating said third photosensitive material with one or more reference beams of light coherent with the light from said first source of coherent light so as to form a hologram, said one or more reference beams eminating from one or more second sources of coherent light, each of which second sources of coherent light is related to a source of incoherent light used in the next step of this process such that at least one of each related pair is an expanded light source, thereby recording an image hologram of said second image matrix on said photosensitive material in multiple superposition; and
   6. forming a real image of said object by illuminating said image hologram with one or more incoherent light sources, which incoherent light sources are related to said one or more second sources of coherent light as previously recited, from the directions opposite to those of said one or more reference beams use in the preceding step, whereby a three-dimensional image free from dead spaces may be viewed from the vicinity of the real image of said first lens array.

2. The method of forming three-dimensional images as defined in claim 1 wherein said diffuser screen is of the transparent type and a plane mirror is used in one of said steps, thereby obtaining a right orientation in the reproduction space.

3. The method of forming three-dimensional images as defined in claim 1 wherein said diffuser screen is of the reflection type.

4. The method of forming three-dimensional images claimed in claim 1 wherein
   a plurality of first color-separated image matrices are obtained in the first step of the process recited in claim 10 using black and whilte photosensitive materials and a plurality of color filters,
   a plurality of second color-separated image matrices are obtained in the third step of said process, each of said plurality of second color-separated image matrices corrresponding to one of said plurality of first color-separated image matrices,
   a plurality of reference beams are used in the fifth step of said process, each of said plurality of reference beams being directed on said photosensitive surface for holography from a different direction and each of said plurality of reference beams being used with only one of said plurality of second color-separated image matrices, and
   a plurality of incoherent light sources are used in the sixth step of said process, each of said plurality of incoherent light sources being color-filtered in a manner corresponding to the color separation of the corresponding one of said first color-separated image matrices, whereby a color three-dimensional image is formed.

5. The method of forming three-dimensional images claimed in claim 4 wherein said plurality of reference beams are of different wave lengths corresponding to the wave lengths recorded by the corresponding one of said plurality of first color-separated image matrices.

6. The method of forming three-dimensional images claimed in claim 1 wherein
   a plurality of first color-separated image matrices are obtained in the first step of the process recited in claims 10 using black and white photosensitive materials and a plurality of color filters,
   a single second image matrix is recorded on color photosensitive material in the third step of said process,
   a plurality of first sources of coherent light are used in the fourth step of said process, each of said plurality of first sources of coherent light being of a different wave length corrresponding to one of the colors of the color separation made in the first step of said process,
   a plurality of reference beams are used in the fifth step of said process, each of said plurality of reference beams being directed on said photosensitive material for holography from a different direction, and a plurality of incoherent light sources are used in the sixth step of said process, each of said plurality of incoherent light sources being color-filtered in a manner corresponding to the wave length of the corresponding one of said plurality of reference beams, whereby a color three-dimensional image is formed.

7. The method of forming three-dimensional images claimed in claim 6 wherein each of said plurality of reference beams is of a different wave length corresponding to the wavelength of the one of said plurality of first sources of coherent light with which it is used.

8. The method of forming three-dimensional, images claimed in claim 6 wherein said single second image matrix is simultaneously illuminated by more than one of said plurality of first sources of coherent light.

9. The method of forming three-dimensional images claimed in claim 1 wherein a single first image matrix is obtained in the first step of the process recited in claim 10 using color photosensitive material, a plurality of second color-separated image matrices are obtained in the third step of said process using black and white photosensitive materials and a plurality of color filters, a plurality of reference beams are used in the fifth step of said process, each of said plurality of reference beams being directed on said photosensitive surface for holography from a different direction and each of said plurality of reference beams being used with only one of said plurality of second color-separated image matrices, and a plurality of incoherent light sources are used in the sixth step of said process, each of said plurality of incoherent light sources being color-filtered in a manner corresponding to the wave length of the corresponding one of said plurality of reference beams, whereby a colored three-dimensional image is formed.

10. The method of forming three-dimensional images claimed in claim 9 wherein a plurality of first sources of coherent light are used in the fourth step of said process, each of said plurality of first souces of coherent light being of a different wave length corresponding to one of the colors of the color separation made in the third step of said process.

11. The method of forming three-dimensional images claimed in claim 9 wherein said plurality of reference beams are of different wave lengths corresponding to one of the colors of the color separation made in the third step of said process.

12. The method of forming three-dimensional images claimed in claim 1 wherein a single first image matrix is obtained in the first step of the process recited in claim 10 using color photosensitive material, a single second image matrix is recorded on color photosensitive material in the third step of said process, a plurality of first sources of coherent light are used in the fourth step of said process, each of said plurality of first sources of coherent light being of a different wave length, a plurality of incoherent light sources are used in the sixth step of said process, each of said plurality of incoherent light sources being color-filtered in a manner corresponding to the wave length of one of said plurality of first sources of coherent light, whereby a colored three-dimensional image is formed.

13. The method of forming three-dimensional images claimed in claim 12 wherein said plurality of reference beams are of different wave lengths corresponding to the wave lengths of the one of said plurality of first sources of coherent light with which it is used.

14. The method of forming three-dimensional images claimed in claim 12 wherein said single second image matrix is simultaneously illuminated by more than one of said plurality of first sources of coherent light.

* * * * *